(12) United States Patent
Itoh et al.

(10) Patent No.: US 7,787,347 B2
(45) Date of Patent: Aug. 31, 2010

(54) OPTICAL HEAD DEVICE AND OPTICAL INFORMATION PROCESSOR

(75) Inventors: Tatsuo Itoh, Osaka (JP); Teruhiro Shiono, Osaka (JP); Seiji Nishino, Osaka (JP)

(73) Assignee: Panasonic Corporation, Osaka (JP)

( * ) Notice: Subject to any disclaimer, the term of this patent is extended or adjusted under 35 U.S.C. 154(b) by 472 days.

(21) Appl. No.: 11/918,426

(22) PCT Filed: Apr. 10, 2006

(86) PCT No.: PCT/JP2006/307551

§ 371 (c)(1),
(2), (4) Date: Oct. 12, 2007

(87) PCT Pub. No.: WO2006/112288

PCT Pub. Date: Oct. 26, 2006

(65) Prior Publication Data

US 2009/0052304 A1 Feb. 26, 2009

(30) Foreign Application Priority Data

Apr. 14, 2005 (JP) ............................ 2005-116836

(51) Int. Cl.
*G11B 7/00* (2006.01)
(52) U.S. Cl. ................. 369/112.01; 369/44.23
(58) Field of Classification Search ............. 369/44.23, 369/11.24, 112.01, 112.12, 44.12, 112.23, 369/112.1, 44.11, 112.02, 44.24
See application file for complete search history.

(56) References Cited

U.S. PATENT DOCUMENTS

| | | | |
|---|---|---|---|
| 5,608,695 A | | 3/1997 | Yamazaki |
| 5,790,504 A | * | 8/1998 | Hayashi et al. ........ 369/112.12 |
| 6,104,689 A | | 8/2000 | Noguchi |
| 6,266,314 B1 | * | 7/2001 | Fukakusa et al. ....... 369/112.01 |
| 6,278,681 B1 | | 8/2001 | Nagano |
| 6,466,526 B1 | | 10/2002 | Onayama |

(Continued)

FOREIGN PATENT DOCUMENTS

JP 2624255 12/1988

(Continued)

OTHER PUBLICATIONS

International Search Report of May 2, 2006 issued in the International Application No. PCT/JP2006/307551.

*Primary Examiner*—Nabil Z Hindi
(74) *Attorney, Agent, or Firm*—Wenderoth, Lind & Ponack, L.L.P.

(57) ABSTRACT

A laser beam 32 reflected by an information layer of a multilayer optical disc 26 is reflected and split by reflecting surfaces 31a', 31b, 31c and 31d to be incident on a photodetector element 36 as laser beams 33, 34 and 35. The laser beam 34 is collected on a light receiving region 38 for RF detection to generate an RF signal. The laser beams 33, 35 are incident on light receiving regions 37a, 37b for focus detection, and a focus error signal is generated by an SSD method. A laser beam 65 reflected by an information layer adjacent to the above information layer partially transmits through the reflecting surface 31a' to be imaged on a light receiving region 66 for tracking detection, and a tracking error signal is generated.

13 Claims, 30 Drawing Sheets

U.S. PATENT DOCUMENTS

| | | | |
|---|---|---|---|
| 6,529,454 B1 * | 3/2003 | Asoma et al. | 369/44.12 |
| 6,542,447 B1 * | 4/2003 | Matsuo et al. | 369/44.23 |
| 6,661,765 B2 * | 12/2003 | Nakano et al. | 369/112.01 |
| 6,914,868 B1 * | 7/2005 | Redmond et al. | 369/112.01 |
| 7,065,009 B1 * | 6/2006 | Hasegawa et al. | 369/44.23 |

FOREIGN PATENT DOCUMENTS

| | | |
|---|---|---|
| JP | 2835074 | 12/1990 |
| JP | 7-129980 | 5/1995 |
| JP | 8-185640 | 7/1996 |
| JP | 9-97449 | 4/1997 |
| JP | 10-255300 | 9/1998 |
| JP | 11-96569 | 4/1999 |
| JP | 11-339309 | 12/1999 |
| JP | 2000-173070 | 6/2000 |
| JP | 2001-34997 | 2/2001 |
| JP | 2002-319177 | 10/2002 |
| JP | 2004-127428 | 4/2004 |

\* cited by examiner

OPTICAL HEAD DEVICE AND OPTICAL INFORMATION PROCESSOR

TECHNICAL FIELD

The present invention relates to an optical head device used for the recording, reproduction or deletion of information in or from an optical recording medium (e.g. multilayer optical disc or multilayer optical card) in which a plurality of information layers (recording layers) are laminated, and an optical information processor using such an optical head device.

DESCRIPTION OF THE BACKGROUND ART

For the increase of the recording capacity of optical discs, the wavelengths of light sources are becoming shorter and the numerical apertures (hereinafter, "abbreviated as NA") of objective lenses are becoming larger. The wavelength of a light source wavelength is 650 nm and the NA of an objective lens is 0.6 for DVD discs, but an optical system whose light source has a wavelength of 405 nm and objective lens has an NA of 0.85 has been proposed for next-generation optical discs.

For the further increase of the recording capacity, a multilayer optical disc in which a multitude of information layers are superimposed at specified intervals in the thickness direction of the optical disc is also being developed. At the time of information reproduction from this multilayer optical disc, there has been a problem of interlayer crosstalk that signals from the other layers leak into signals of the information layer desired to be reproduced. Against this problem, there has been proposed an optical head device for removing reflected lights from the information layers other than the reproduction layer using a confocal optical system.

FIG. 30 is a diagram showing the construction of a conventional optical head device disclosed in patent literature 1. In FIG. 30, identified by 1 is a semiconductor laser, by 2 a collimator lens, by 3 a beam shaping prism, by 4, 5 nonpolarizing beam splitters, by 6 an objective lens and by 7 a multilayer magnetooptical recording medium, wherein information layers are laminated in the multilayer magnetooptical recording medium 7. Further, identified by 8 a half-wave plate, by 9 a polarizing beam splitter, by 10, 11 collective lenses, by 12, 13 pinholes provided at focus positions of the collective lenses 10, 11, by 14, 15 photodetectors, by 16 a cylindrical lens and by 17 a quarter divided photodetector.

In FIG. 30, an information signal of the multilayer magnetooptical recording medium 7 is detected from a difference in light quantities having passed through the pinholes 12, 13, and reflected lights from the layers of the multilayer magnetooptical recording medium other than a reproduction layer are mostly shielded by the pinholes 12, 13. Thus, an optical head device with less interlayer crosstalk can be obtained. In the focus and tracking servo of the information layer of the multilayer magnetooptical recording medium 7, a focus error signal is obtained by a known astigmatic method and a tracking error signal is obtained by a push-pull method or heterodyne method using the cylindrical lens 16 and the quarter divided photodetector 17.

As a tracking method for the multilayer optical disc as described above, there is also proposed the one in which a tracking groove is formed only in one layer out of a plurality of information layers, a tracking error signal is obtained from the tracking groove, a signal is written in a layer different from the one formed with the tracking groove, and then the tracking error signal is obtained based on the written signal and a signal is written in another layer, thereby successively performing tracking between the layers as disclosed in patent literature 2.

Although the reflected lights from the layers other than the reproduction layer are eliminated using the pinholes in patent literature 1, a method obtaining the same effect by reducing the size of a photodetector to about the size of pinholes is disclosed in patent literature 3.

However, in the construction of patent literature 1, the photodetector for servo and the one for information signal detection needed to have the positions thereof individually adjusted and individual displacements thereof needed to be suppressed in response to temperature variation and vibration since being separated from each other. Further, patent literature 2 does not disclose any optical construction combined with the confocal optical system. Furthermore, patent literature 3 does not disclose a specific optical construction although an astigmatism method and a three beam method are disclosed to obtain focus and tracking servo signals.

Patent Literature 1: Japanese Patent No. 2624255

Patent Literature 2: Japanese Patent No. 2835074

Patent Literature 3: Japanese Unexamined Patent Publication No. H08-185640

DISCLOSURE OF THE INVENTION

An object of the present invention is to provide reliable and small-size optical head device and optical information processor for multilayer optical discs using a simple optical system commonly used as an optical system for servo and an optical system for information signal detection.

One aspect of the present invention is directed to an optical head device, comprising at least one light source; a collective lens for focusing a light emitted from the light source on an arbitrary recording layer of a multilayer optical disc including a plurality of recording layers; a light splitting element for splitting a reflected light from the arbitrary one of the plurality of recording layers at least into three lights; and a photodetector in which at least three first to third light receiving regions for detecting the split lights split by the light splitting element are provided on one substrate, wherein the light splitting element causes one split light to be incident on the first light receiving region to detect an information signal from the optical disc, the second light receiving region is substantially arranged at a side of the focus position of the split light closer to the collective lens, and the third light receiving region is substantially arranged at a position located at a side of the focus position of the split light opposite to the collective lens and symmetrical with the second light receiving region.

Another aspect of the present invention is directed to an optical information processor, comprising the above optical head device; and a driving mechanism for driving the optical disc.

According to the above respective constructions, since one split light is incident on the first light receiving region to detect the information signal from the optical disc, the first light receiving region can be used as the photodetector for information signal detection and since the second light receiving region is substantially provided at the side of the focus position of the split light closer to the collective lens on a light path, and the third light receiving region is substantially arranged at the position located at the side of the focus position of the split light opposite to the collective lens and symmetrical with the second light receiving region on the light path, the second and third light receiving regions can be used as photodetectors for focus servo. Since the first to third light receiving regions are provided on one substrate, a servo optical system and an optical system for information signal detection can be commoditized by integrating the photodetector for focus servo and the photodetector for information signal detection. As a result, highly reliable and small-sized optical head device and optical information processor for multilayer optical discs can be realized by using a common and simple optical system commoditizing the servo optical system and the optical system for information signal detection.

BEST MODES FOR EMBODYING THE INVENTION

Hereinafter, embodiments of the present invention are described with reference to the drawings.

First Embodiment

Figure 1:
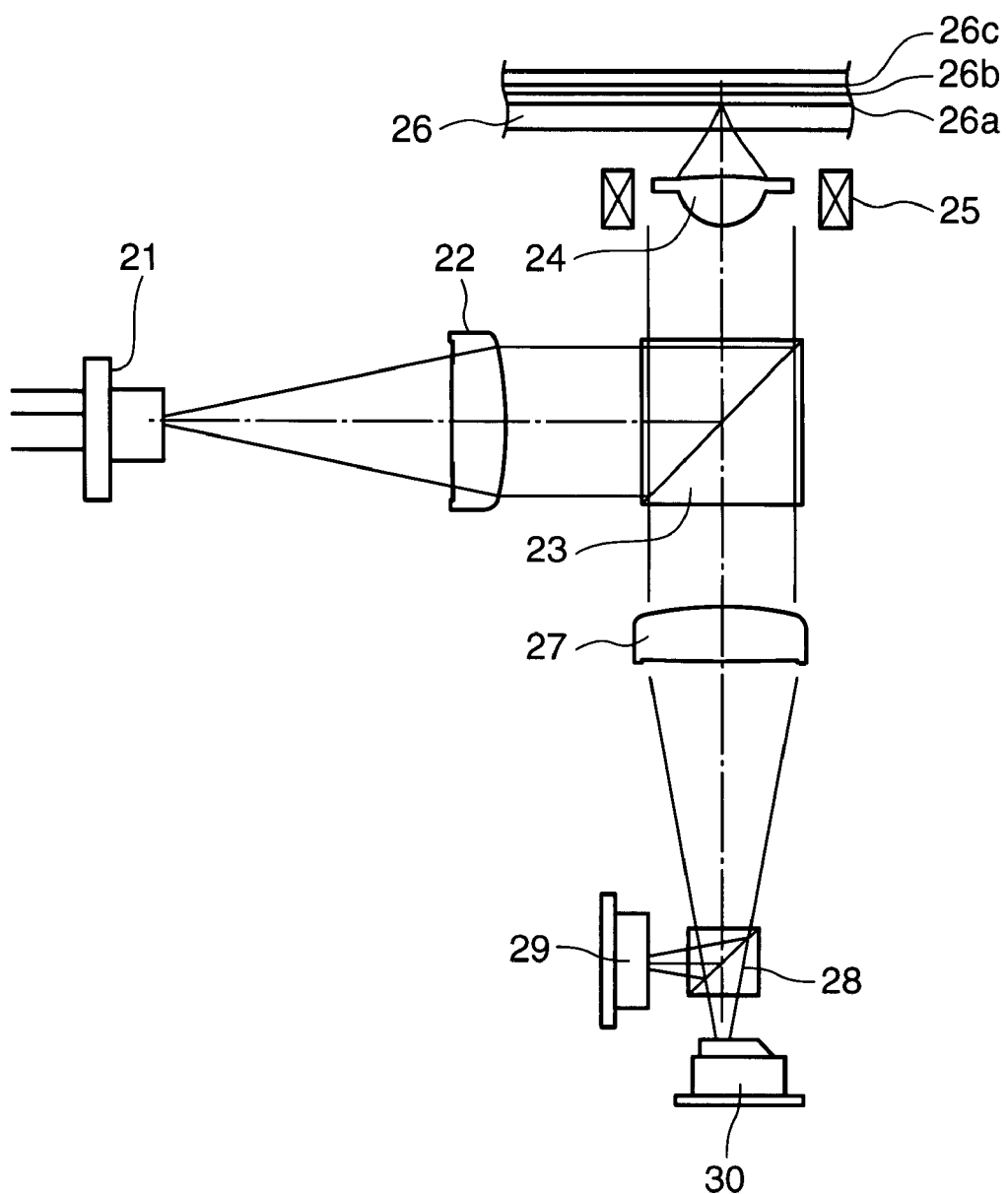
FIG. 1 is a construction diagram of an optical head device according to a first embodiment of the invention.

First, an optical head device according to a first embodiment of the present invention is described. FIG. 1 is a construction diagram of the optical head device according to the first embodiment of the present invention. In FIG. 1, the optical head device is provided with a semiconductor laser 21, a collimator lens 22, a beam splitter 23, a collective lens 24, an actuator 25, a detection lens 27, a beam splitter 28 and photodetectors 29, 30. A multilayer optical disc 26 includes at least information layers 26a, 26b and 26c as recording layers.

The collimator lens 22 collimates a laser beam emitted from the semiconductor laser 21. The beam splitter 23 introduces the laser beam emerging from the collimator lens 22 to the collective lens 24 while changing a light path of the laser beam. In this way, the laser beam emitted from the semiconductor laser 21 is incident on the collective lens 24 by having the light path thereof bent by the beam splitter 23 after being collimated by the collimator lens 22.

The collective lens 24 is driven by the actuator 25 and focuses the laser beam on one of the information layers 26a, 26b and 26c of the multilayer optical disc 26. The actuator 25 moves a focus spot of the laser beam to an arbitrary position of the multilayer optical disc 26 by moving the collective lens 24 while holding it. The laser beam reflected by the multilayer optical disc 26 is collected by the detection lens 27 after transmitting through the collective lens 24 and the beam splitter 23.

The beam splitter 28 is for splitting the laser beam collected by the detection lens 27 into parts to be introduced to the photodetectors 29, 30. The photodetector 29 obtains a tracking error signal from the reflected light from the multilayer optical disc 26 by a known push-pull method or phase difference method. The photodetector 30 obtains an RF signal and a focus error signal from the reflected light from the multilayer optical disc 26. An unillustrated control circuit actuates the actuator 25 using the focus error signal obtained from the photodetector 30 and the tracking error signal obtained from an output of the photodetector 29, thereby performing recording and reproduction in and from the multilayer optical disc 26.

Figure 2:
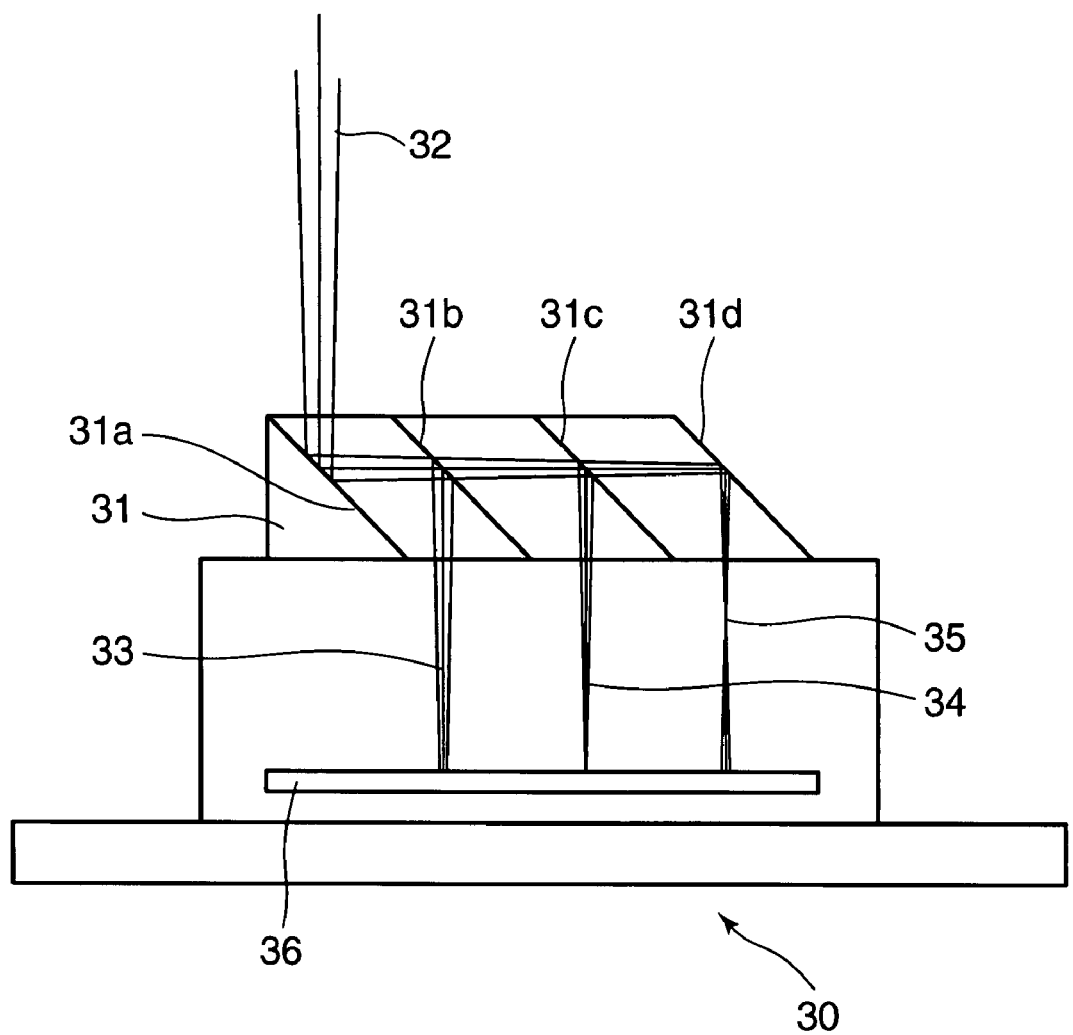
FIG. 2 is a section showing the construction of a photodetector shown in FIG. 1.

FIG. 2 is a section showing the construction of the photodetector 30 shown in FIG. 1. In FIG. 2, the photodetector 30 includes a compound prism 31 and a photodetector element 36. The compound prism 31 includes reflecting surfaces 31a, 31b, 31c and 31d, wherein the reflecting surfaces 31b, 31c are partial reflecting surfaces. Here, a laser beam 32 is a laser beam collected by the detecting lens 27 and introduced to the reflecting surfaces 31b, 31c and 31d after being reflected by the reflecting surface 31a. A laser beam 33 is a laser beam partly reflected by the reflecting surface 31b, a laser beam 34 is a laser beam partly reflected by the reflecting surface 31c, and a laser beam 35 is a laser beam partly reflected by the reflecting surface 31d. The reflectivities of the reflecting surfaces 31b, 31c and 31d are determined such that the light quantities of the reflected laser beams 33, 35 are equal. The photodetector element 36 includes photodiodes each divided into regions.

Figure 3:
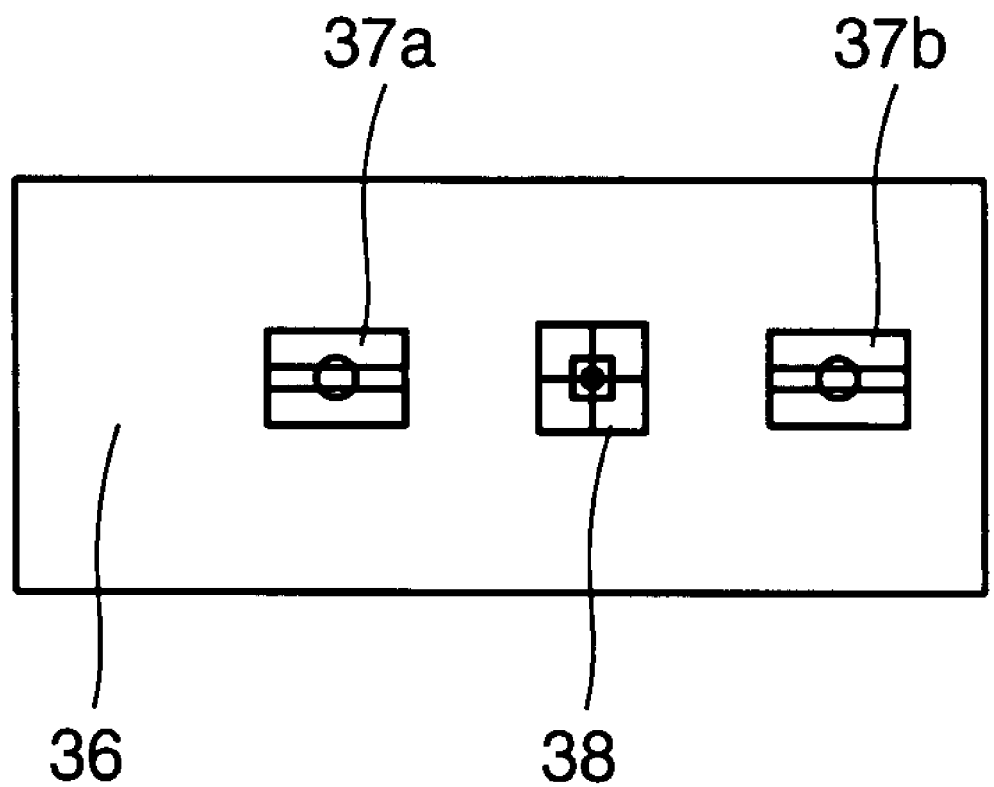
FIG. 3 is a top view of a photodetector element shown in FIG. 2.

FIG. 3 is a top view of the photodetector element 36 shown in FIG. 2. In FIG. 3, the photodetector element 36 includes light receiving regions 37a, 37b for focus detection and a light receiving region 38 for RF detection. The light receiving regions 37a, 37b for focus detection receive the laser beams 33, 35, respectively, and the light receiving region 38 for RF detection receives the laser beam 34. The light receiving region 38 for RF detection is substantially arranged at a focus point position of the laser beam 32 on a light path, the light receiving region 37a for focus detection is substantially arranged at a position closer to the collective lens 24 than the focus position of the laser beam 32 on the light path, and the light receiving region 37b for focus detection is substantially arranged at a position symmetrical with the light receiving region 37a for focus detection on the light path with respect to the focus point position of the laser beam 32.

Specifically, since the laser beam 32 is reflected by the reflecting surfaces 31b, 31c and 31d in this order, the lengths of the light paths of the laser beams 33 to 35 become longer in this order. If the light receiving region 38 for RF detection is arranged at the focus point position of the laser beam 32, the focus point position of the laser beam 33 is located beyond the light receiving region 37a for focus detection, the focus point position of the laser beam 35 is located before the light receiving region 37b for focus detection, and the focus point position of the laser beam 33 and that of the laser beam 35 are located at symmetrical positions with respect to the focus point position of the laser beam 34.

Here, the operation of the photodetector 30 is described. A known spot size detection method (SSD method) is used as the focus error detection method. The SSD method is briefly described. Each of the light receiving regions 37a, 37b for focus detection is formed by a photodetector divided at least into three parts, and the focus error signal can be obtained from a differential signal of the light receiving regions 37a, 37b for focus detection as follows.

In FIG. 1, when the focal point of the collective lens 24 is adjusted to a specified information layer of the multilayer optical disc 26 (in-focus condition), the laser beam 32 in FIG. 2 is collected on the light receiving region 38 for RF detection shown in FIG. 3. At this time, the focus error signal is 0 since the spot sizes of the laser beams in the light receiving regions 37a, 37b for focus detection arranged substantially at the symmetrical positions on the light path with respect to the focus point position of the laser beam 32 are equal. On the other hand, if the collective lens 24 deviates from the in-focus condition, the focus position of the laser beam 32 is displaced to differentiate the spot sizes of the laser beams on the light receiving regions 37a, 367b for focus detection. Thus, the focus error signal cannot be 0. Accordingly, the in-focus condition can be kept by driving the actuator 25 such that the focus error signal becomes 0.

Figure 4:
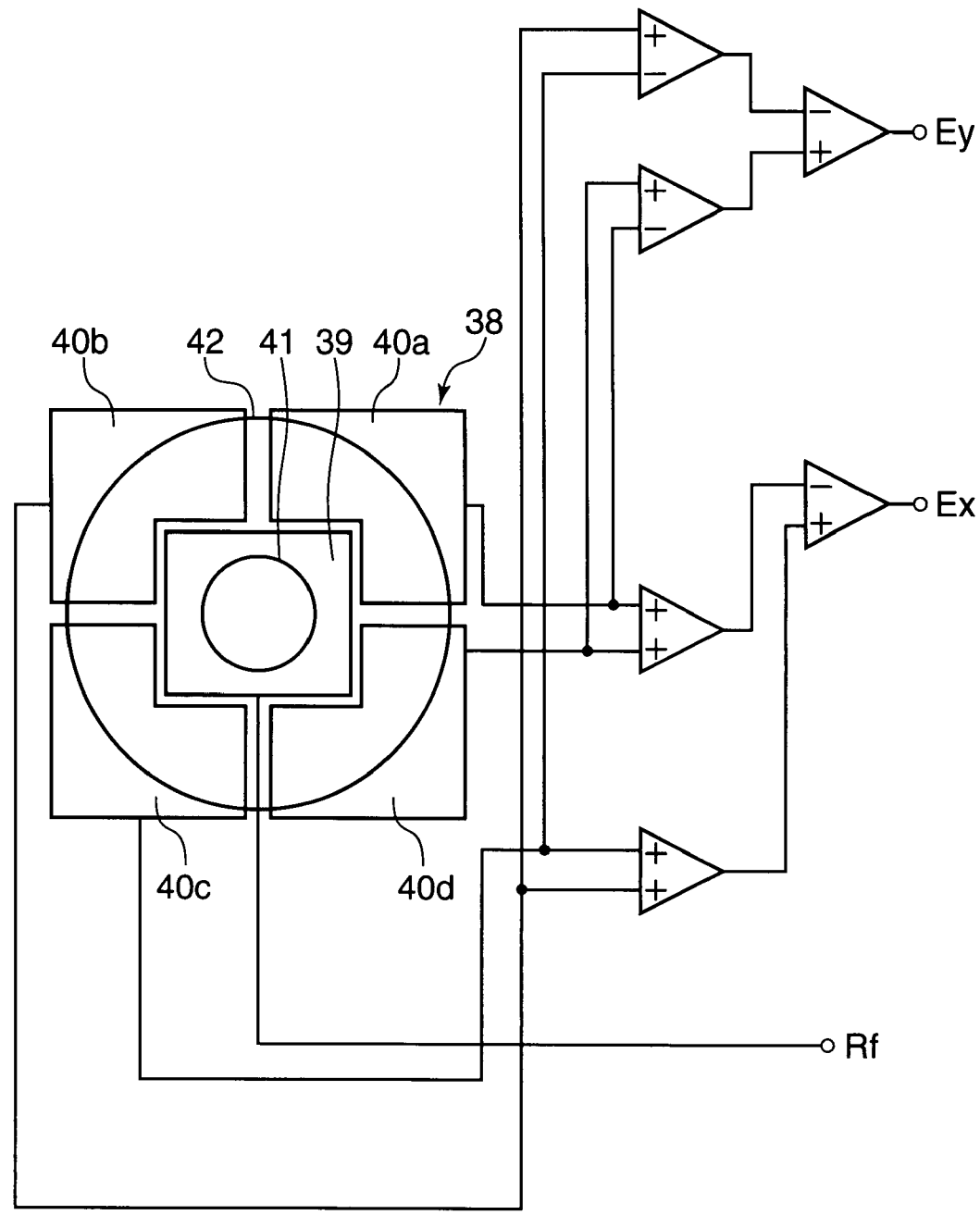
FIG. 4 is a diagram showing a light receiving region pattern and detection light spots of a light receiving region for RF detection shown in FIG. 3.

Next, the reproduction of an information signal using the photodetector 30 is described with reference to FIG. 4. FIG. 4 is a diagram showing a light receiving region pattern and detection light spots of the light receiving region 38 for RF detection shown in FIG. 3.

As shown in FIG. 4, the light receiving region pattern of the light receiving region 38 for RF detection is comprised of a light receiving region 39 having a rectangular shape (e.g. a square shape) and four substantially L-shaped divided light receiving regions 40a to 40d arranged around the light receiving region 39. It should be noted that the shapes of the light receiving region and the divided light receiving regions are not particularly limited to the above example, a circular light receiving region and substantially fan-shaped divided light receiving regions, etc. may be used.

Light spots 41, 42 are detection light spots collected by the detection lens 27. For example, in the case of reproduction from the information layer 26b shown in FIG. 1, the detection light spot 41 is a collected light spot of the reflected light of the information layer 26b and the detection light spot 42 is a collected light spot of the reflected lights from the information layers 26a, 26c adjacent to the information layer 26b.

The detection light spot 41 is collected on the light receiving region 39, and an information signal (RF signal Rf) of the information layer 26b can be obtained from an output of the light receiving region 39. At this time, since the detection light spot 42 from the information layers 26a, 26c adjacent to the information layer 26b expands on a light receiving surface of the light receiving region 38 for RF detection, interlayer crosstalk can be reduced as described in the description of the prior art by making the size of the light receiving region 39 smaller than the size of the detection light spot 42.

The dimensions of the light receiving region 39 (dimensions in longitudinal and transverse directions, which are equal in this embodiment since the light receiving region 39 has a square shape) are preferably equal to or smaller than the threefold of the Airy disc diameter of the laser beam 32 given by equation (1).

$$1.22 \times \lambda / NA \quad (1)$$

In equation (1), λ denotes the wavelength of the laser beam 32 and NA the numerical aperture of the detection lens 27. If it is assumed that the dimensions of the light receiving region 39 are equal to or smaller than the threefold of the Airy disc diameter of the detection light spot 41, intervals between the information layers 26a, 26b and 26c can be reduced to about the Rayleigh length of the focus spot of the collective lens 24. The dimensions of the light receiving region 39 are preferably equal to or larger than the Airy disc diameter of the detection light spot 41 in consideration of the positioning accuracy of the light receiving region 39 and the detection light spot 41.

The respective dimensions (shorter ones of the dimensions in longitudinal and transverse directions) of the light receiving regions 37a, 37b for focus detection shown in FIG. 3 are preferably equal to or smaller than the sixfold of the Airy disc diameter of the laser beam 32. In this case, the influence of reflected lights from the information layers other than the recording/reproduction layer can be reduced without deteriorating the focus error signal. The interlayer crosstalk can also be reduced by subtracting a constant multiple of a sum signal of the divided light receiving regions 40a to 40d from the RF signal Rf. This constant is determined based on the layer interval of the information layers 26a, 26b and 26c.

For example, the radius of defocused spots at the adjacent information layers 26a, 26c at a distance d with a beam from the collective lens 24 focused on the information layer 26b is NA×d, assuming that the numerical aperture of the collective lens 24 is NA. Since the interlayer crosstalk increases in inverse proportion to the spot diameter at the adjacent information layers 26a, 26c, the constant can be obtained by multiplying an inverse of the layer interval by a proportionality coefficient.

Further, a spot position X error signal Ex is obtained from a difference between a sum signal of the divided light receiving regions 40a, 40d and a sum signal of the divided light receiving regions 40b, 40c and a spot position Y error signal Ey is obtained from a difference between the sum signal of the divided light receiving regions 40a, 40b and a sum signal of the light receiving regions 40c, 40d. Thus, the position of the detection light spot 42 can be corrected by detecting a displacement of the detection light spot 42 and, for example, by minutely moving the detection lens 27 in FIG. 1 by an unillustrated actuator. Further, since the detection light spots 41, 42 are coaxial, the position of the detection light spot 41 can be simultaneously corrected by correcting the position of the detection light spot 42. If the displacement of the detection light spot 41 is large, the detection light spot 41 is incident on the divided light receiving regions 40a to 40d. Thus, it goes without saying that a position error signal is obtained in the same manner as above.

By the above construction, in this embodiment, the interlayer crosstalk can be reduced by making the light receiving region 39 of the light receiving region 38 for RF detection smaller, and the displacement of the detection light spot can be detected by the divided light receiving regions 40a to 40d to be corrected. Further, by integrating the light receiving region 38 for RF detection and the light receiving regions 37a, 37b for focus detection into one photodetector element 36, relative displacements can be eliminated.

Upon reproduction from the multilayer optical disc 26, a tracking error signal can also be obtained from the light receiving region 38 for Rf detection by the known pull-push method or phase difference method. Further, a micropinhole may be provided at the focus position of the laser beam 34 to perform a photodetection through the micropinhole.

Second Embodiment

Figure 5:
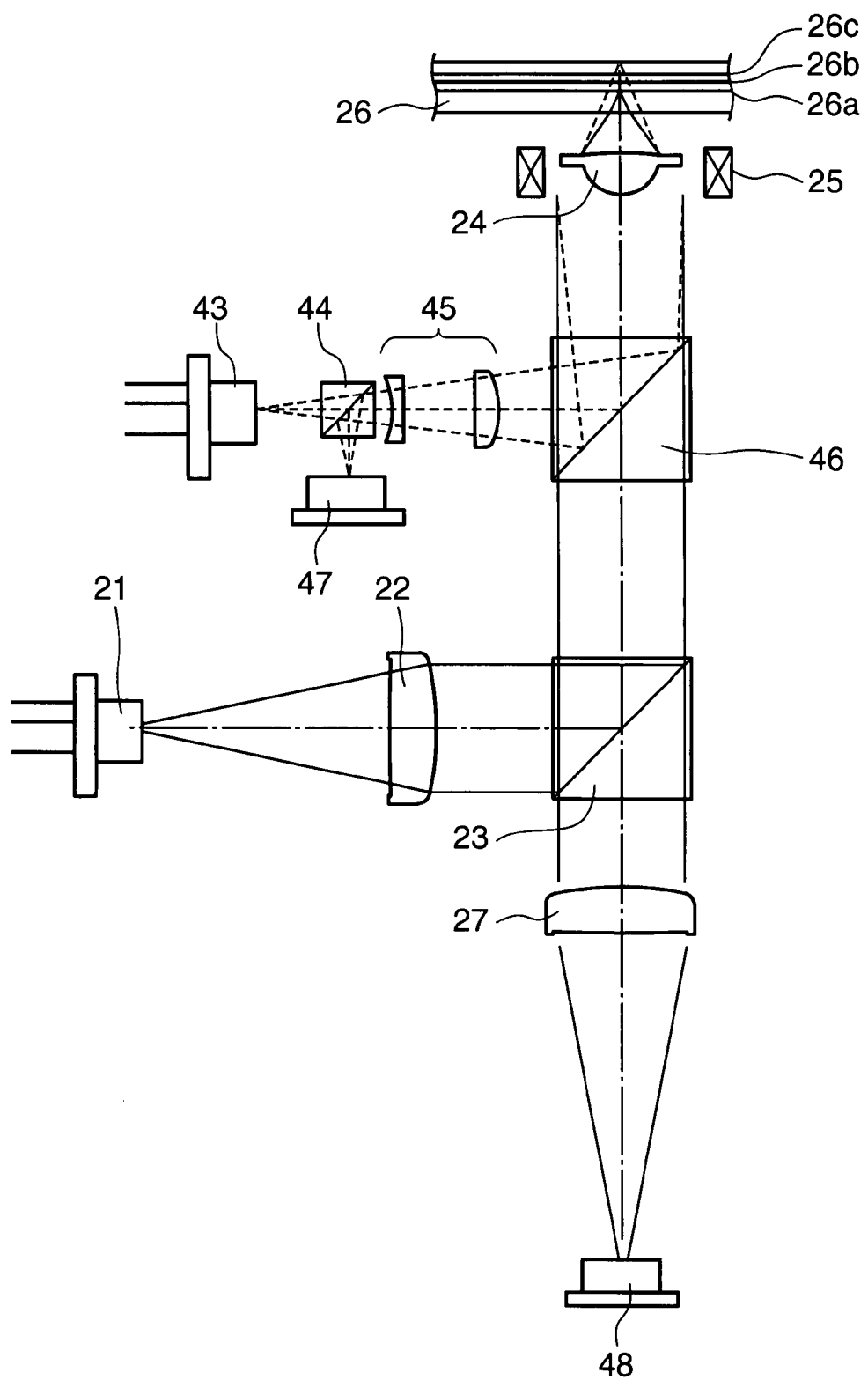
FIG. 5 is a construction diagram of an optical head device according to a second embodiment of the invention.

Next, an optical head device according to a second embodiment of the present invention is described. FIG. 5 is a construction diagram of the optical head device according to the second embodiment of the present invention. In FIG. 5, the same elements as in FIG. 1 are identified by the same reference numerals and are not described. In this embodiment, a multilayer optical disc 26 includes a servo surface for tracking. For example, a servo surface formed with a tracking groove can be provided on the bottommost or uppermost surface of information layers of a multilayer optical disc 26. In this embodiment as well, a beam emitted from a semiconductor laser 21 is received by a photodetector 48 to detect an RF signal and a focus error signal similar to the optical head device shown in FIG. 1.

Figure 6:
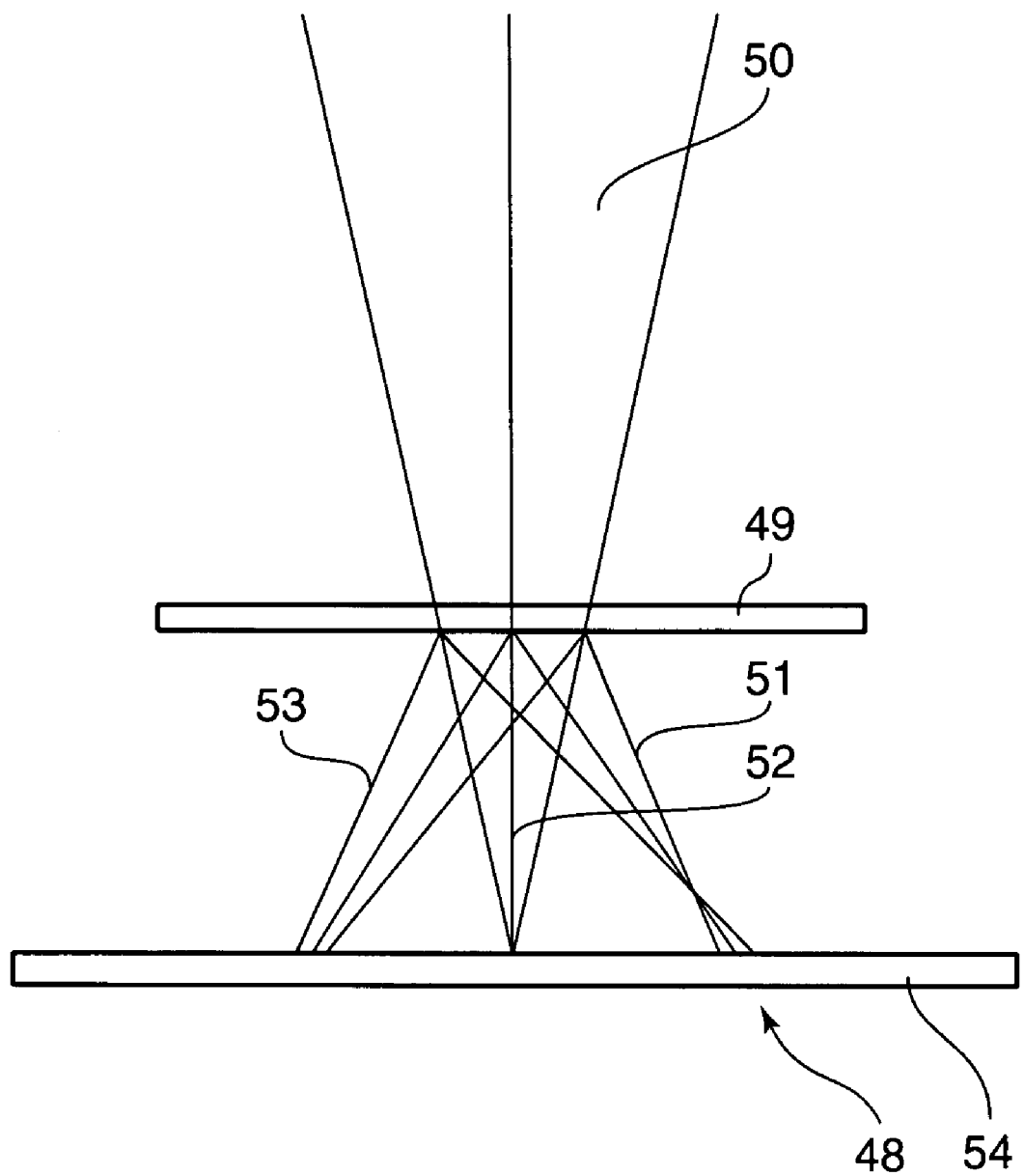
FIG. 6 is a construction diagram of a photodetector shown in FIG. 5.

FIG. 6 is a construction diagram of the photodetector 48 shown in FIG. 5. The photodetector 48 shown in FIG. 6 includes a hologram 49 and a photodetector element 54, wherein the photodetector element 54 includes a photodiode divided into regions. Further, a laser beam 50 is a laser beam collected by a detection lens 27; a diffracted light 51 is a +1$^{st}$-order diffracted light diffracted by the hologram 49; a diffracted light 52 is a 0$^{th}$-order diffracted light having transmitted through the hologram 49; and a diffracted light 53 is a −1$^{st}$-order diffracted light diffracted by the hologram 49. The hologram 49 as a diffractive optical element has a function of converging the +1$^{st}$-order diffracted light and a function of diffusing the −1$^{st}$-order diffracted light.

Figure 7:
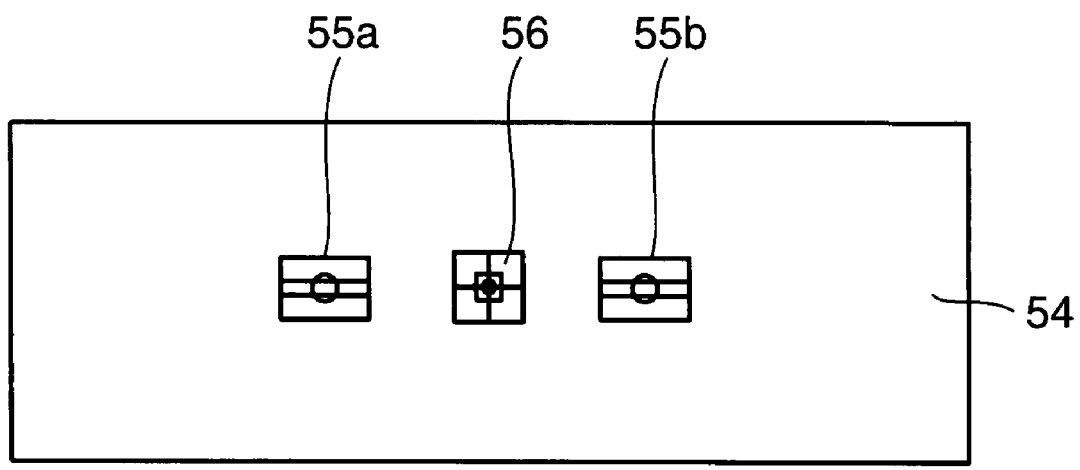
FIG. 7 is a top view of a photodetector element shown in FIG. 6.

FIG. 7 is a top view of the photodetector 54 element shown in FIG. 6. In FIG. 7, the photodetector element 54 includes light receiving regions 55a, 55b for focus detection and a light receiving region 56 for RF detection. The light receiving regions 55a, 55b for focus detection receive the −1$^{st}$-order diffracted light 53 and +1$^{st}$-order diffracted light 51, respectively, and the light receiving region 56 for RF detection receives the 0$^{th}$-order diffracted light 52. The light receiving region 56 for RF detection is substantially arranged at a focus point position of the laser beam 50 on a light path, the light receiving region 55a for focus detection is substantially arranged at a position closer to a collective lens 24 than the focus position of the laser beam 50 on the light path, and the light receiving region 55b for focus detection is substantially arranged at a position symmetrical with the light receiving region 55a for focus detection on the light path with respect to the focus point position of the laser beam 50.

The construction of the light receiving region 56 for RF detection is the same as that of the light receiving region 38 for RF detection according to the first embodiment, and it is similar to the first embodiment and is not described that detection is made by the SSD method as the focus error detection method and interlayer crosstalk is reduced by reducing the central light receiving region in the photodetector 48.

Next, a tracking error signal detection method is described. The optical head device shown in FIG. 5 is further provided with a semiconductor laser 43, a beam splitter 44, a collimator 45, a beam splitter 46 and a photodetector 47, wherein the collimator 45 is, for example, a combination of a concave lens and a convex lens.

A laser beam emitted from the semiconductor laser 43 and having transmitted through the beam splitter 44 and collimator 45 has its light path bent by the beam splitter 46 and collected by the collective lens 24. Here, an interval between the collective lens 24 and the multilayer optical disc 26 generally does not coincide with the one between the focal point of the collective lens 24 and the tracking servo surface of the multilayer optical disc 26 since being controlled by a focus error signal from the photodetector 48.

However, since the focus point position of the laser beam emitted from the semiconductor laser 43 can be changed in an optical axis direction by changing a lens interval of the collimator 45 in this embodiment, the focus point can be adjusted to the tracking servo surface of the multilayer optical disc 26 regardless of the position of the collective lens 24. Accordingly, recording and reproduction can be made in and from the multilayer optical disc 26 by focusing the laser beam emitted from the semiconductor laser 43 on the tracking servo surface of the multilayer optical disc 26 in accordance with the focus error signal from the photodetector 47, performing the tracking of the multilayer optical disc 26 in accordance with the tracking error signal obtained by the photodetector 47, and focusing the laser beam emitted from the semiconductor laser 21 on an arbitrary information layer of the multilayer optical disc 26 in accordance with the focus error signal obtained by the photodetector 48.

By the above construction, in this embodiment, effects similar to those of the first embodiment can be obtained using the hologram 49 and the photodetector element 54. Further, since tracking is performed by obtaining the tracking error signal from the tracking servo surface, it is not necessary to provide tracking grooves in the respective surfaces of the multilayer optical disc 26, whereby inexpensive multilayer optical discs can be realized.

Third Embodiment

Figure 8:
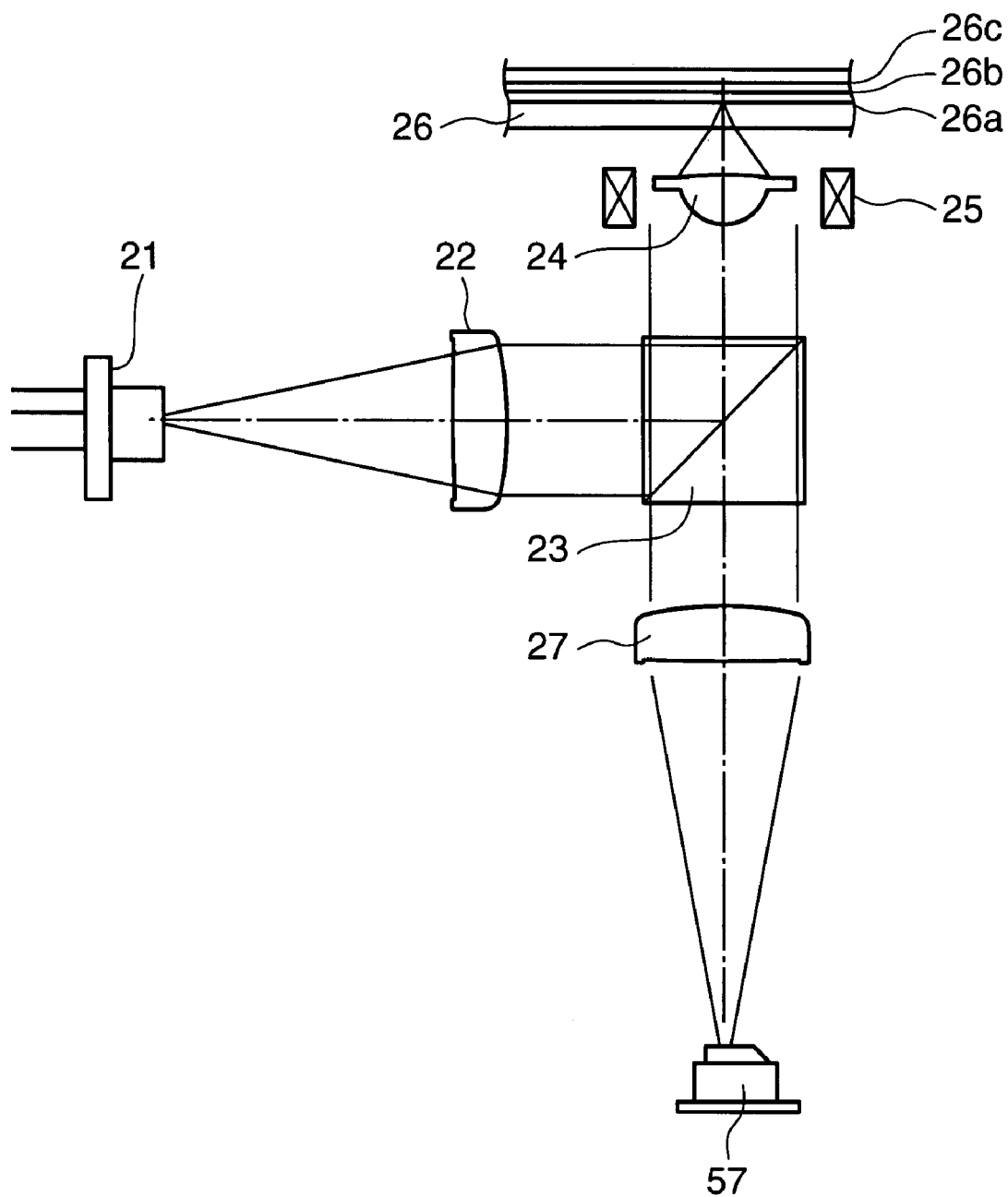
FIG. 8 is a construction diagram of an optical head device according to a third embodiment of the invention.

Next, an optical head device according to a third embodiment of the present invention is described. FIG. 8 is a construction diagram of the optical head device according to the third embodiment of the present invention. In FIG. 8, the same elements as in FIG. 1 are identified by the same reference numerals and are not described. This embodiment shown in FIG. 8 differs from the first embodiment in that a focus error signal, a tracking error signal and an RF signal are detected using a photodetector 57 integrally including the photodetector 30 for focus error signal and RF detection and the photodetector 28 for tracking error signal detection, which are separately provided in the first embodiment. The operation of the photodetector 57 is described below with reference to FIGS. 9 to 11.

Figure 9:
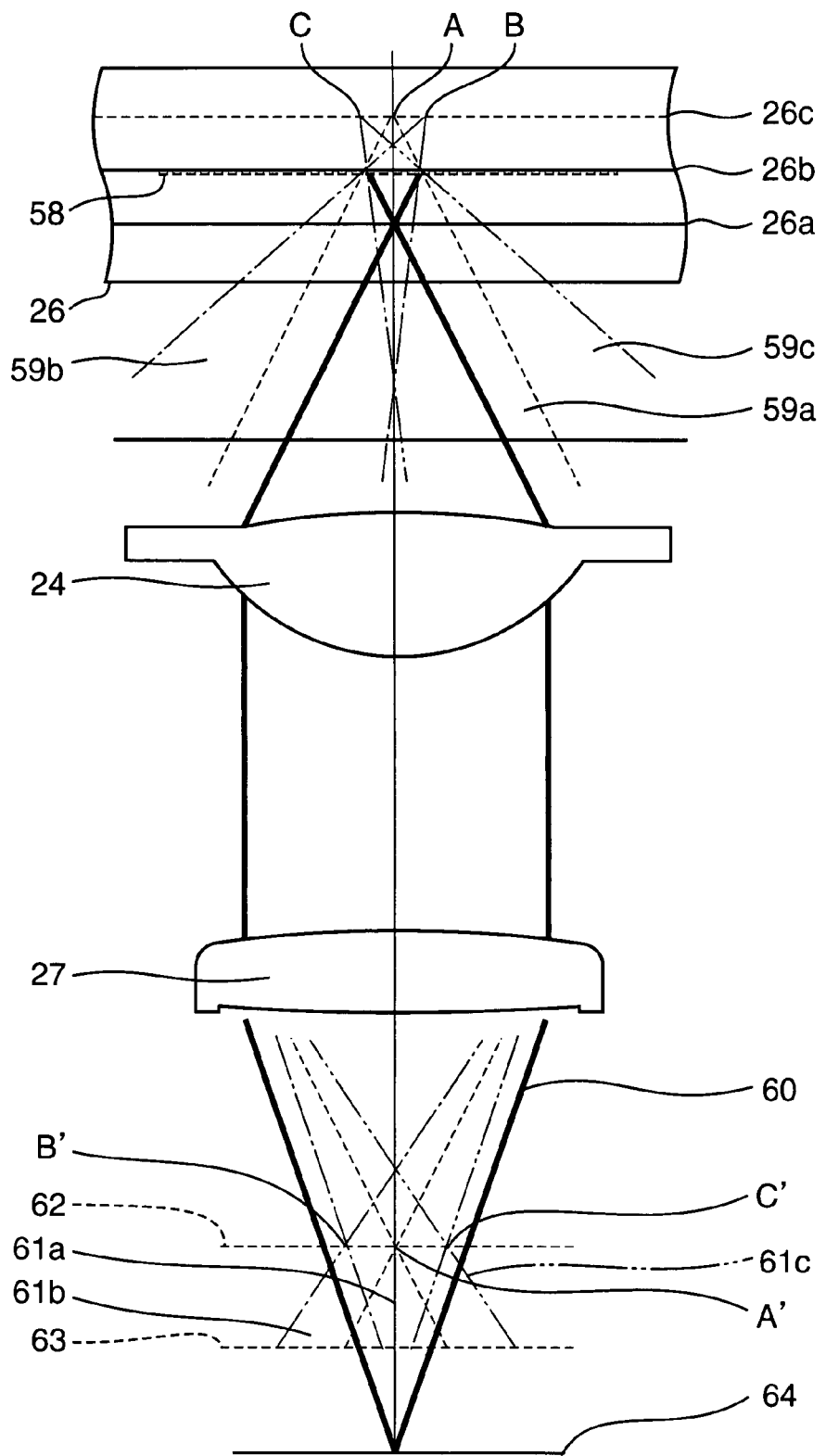
FIG. 9 is a diagram showing a tracking error signal detection method adopted in the optical head device shown in FIG. 8.

FIG. 9 is a diagram showing a tracking error signal detection method adopted in the optical head device shown in FIG. 8. In FIG. 9, the same elements as those in FIG. 1 are identified by the same reference numerals and are not described, and the beam splitter 23 is not shown in order to simplify the description.

An information layer 26b of the multilayer optical disc 26 shown in FIG. 9 is formed with a diffraction grating 58 by a recorded pit row. It should be noted that the diffraction grating 58 may be formed by a track groove provided in the multilayer optical disc 26 beforehand.

Diffracted lights 59a, 59b and 59c are lights diffracted by the diffraction grating 58, and the positions of imaginary light sources of the diffracted lights 59a, 59b and 59c are shown by A, B and C in FIG. 9. A reflected light 60 is the one from the information layer 26a, and detection lights 61a, 61b and 61c are lights obtained by collecting the diffracted lights 59a, 59b and 59c by means of a detection lens 27. An imaginary plane 62 is a plane including focus points of the detection lights 61, 61b and 61c. An imaginary plane 63 is an imaging plane of the diffraction grating 58 and an imaginary plane 64 is an imaging plane of the information layer 26a.

In the example shown in FIG. 9, information is recorded or reproduced with the focus adjusted to the information layer 26a. The light having transmitted through the information layer 26a is diffracted and reflected as the diffracted lights 59a, 59b and 59c by the diffraction grating 58 formed in the adjacent information layer 26b. At this time, the diffracted lights 59a, 59b and 59c are diffused as if they had been emitted from the imaginary light sources A, B and C of FIG. 9, and are imaged on the imaginary plane 62 as images A', B' and C' by an optical system comprised of the collective lens 24 and the detection lens 27.

Subsequently, on the imaginary plane 63 as the imaging plane of the diffraction grating 58, the detection lights 61a, 61b and 61c diffused from the images A', B' and C' interfere with each other to form an image of the diffraction grating 58. Accordingly, tracking can be performed by providing a light receiving region for tracking detection of the photodetector 57 shown in FIG. 8 on the imaginary plane 63 and detecting the brightness of the image. Further, the focus error signal and RF signal of the information layer 26a can be detecting by providing the light receiving regions for focus detection and light receiving region for RF detection of the photodetector 57 shown in FIG. 8 on the imaginary plane 64.

Figure 10:
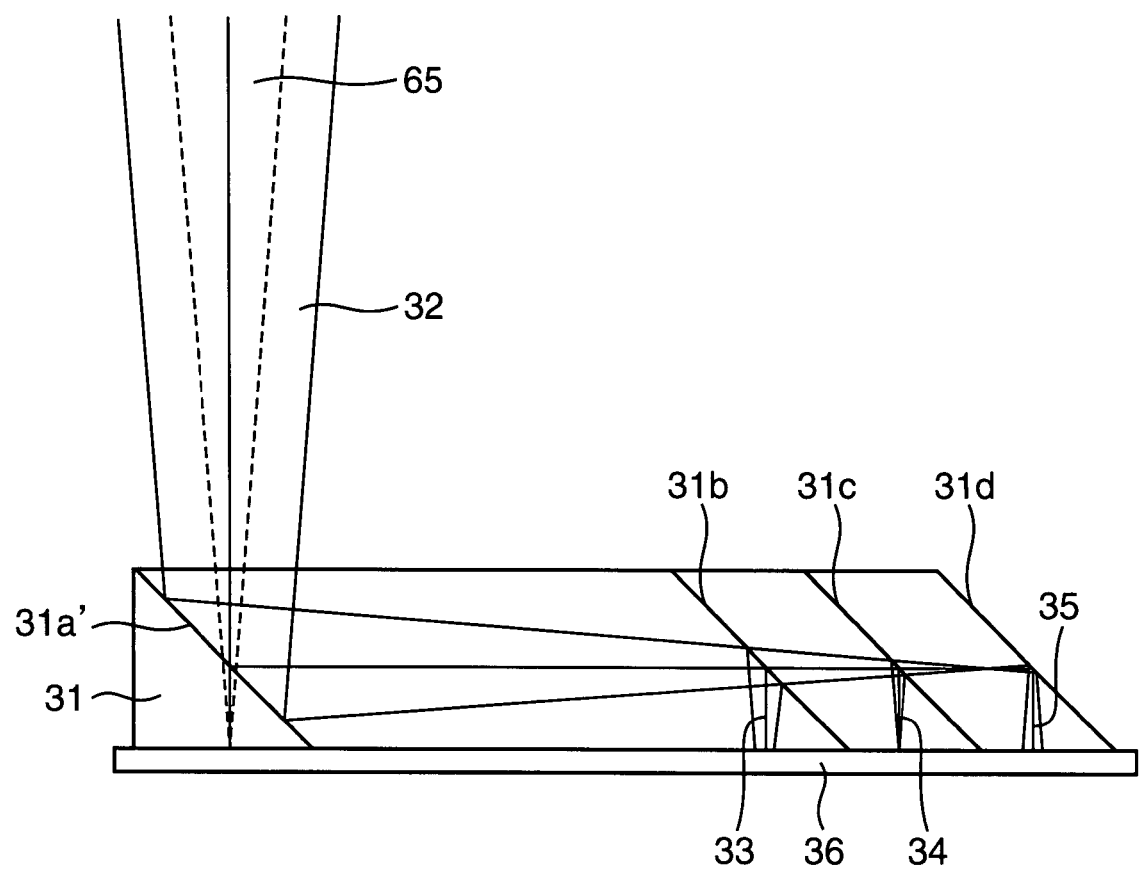
FIG. 10 is a section showing the construction of a photodetector shown in FIG. 8.
Figure 11:
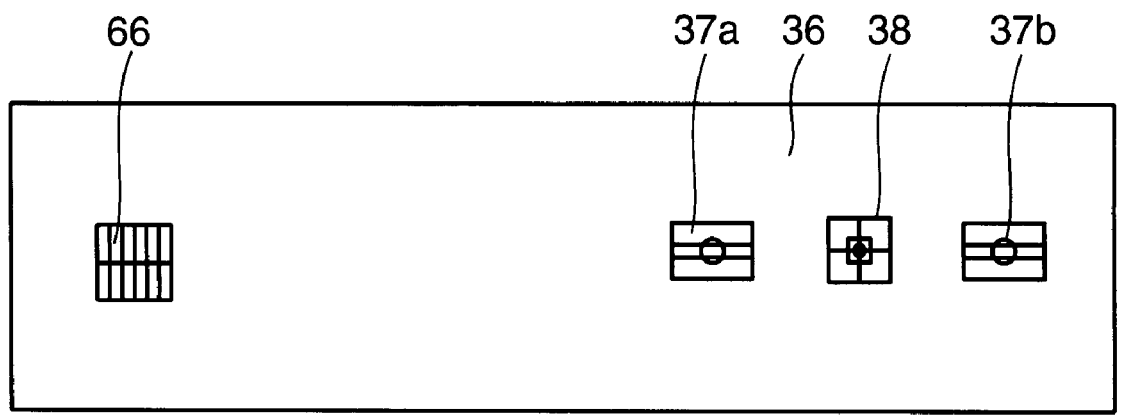
FIG. 11 is a top view of a photodetector element shown in FIG. 10.

FIG. 10 is a section showing the construction of the photodetector 57 shown in FIG. 8, and FIG. 11 is a top view of the photodetector element 36 shown in FIG. 10. In FIGS. 10 and 11, the same elements as those in FIGS. 2 and 3 are identified by the same reference numerals and are not described. Further, the operations of detecting the focus error signal and RF signal are the same as those described in the first embodiment and are not described, and only a tracking error signal detection method is described.

In FIG. 10, a reflecting surface 31a' of a compound prism 31 is a partial reflecting surface, a laser beam 65 is a laser beam reflected by an information layer 26b and the same as a detection light described as the detection lights 61a, 61b and 61c in FIG. 9. Further, in FIG. 11, a light receiving region 66 for tracking detection is formed on the photodetector element 36 together with light receiving regions 37a, 37b for photodetector and a light receiving region 38 for RF detection, and is divided into rectangular regions.

By causing an interval between the reflecting surfaces 31a' and 31c shown in FIG. 10 to coincide with a product of an axial magnification of the optical system comprised of the collective lens 24 and the detection lens 27 and the interval between the information layers of the multilayer optical disc 26, the laser beam 65 can be collected on the light receiving region 66 for tracking detection to form the image of the diffraction grating 58 when a laser beam 32 reflected by the information layer 26a is collected on the light receiving region 38 for RF detection. At this time, the tracking error signal can be obtained by adjusting the division pitch of the light receiving region 66 for tracking detection to the brightness pitch of the image of the diffraction grating 58.

By the above construction, in this embodiment, effects similar to those of the first embodiment can be obtained. Further, since the information pit row of the adjacent layer can be utilized as the tracking error signal, inexpensive multilayer optical discs can be realized without providing tracking grooves in the respective surfaces of the multilayer optical disc 26. Further, by providing the light receiving regions 66 for tracking detection, the light receiving regions 37a, 37b for focus detection and the light receiving region 38 for RE detection on the same substrate, there can be provided an optical head device having a smaller number of parts and a high reliability with smaller displacements of the light source images in response to a temperature change and vibration.

Fourth Embodiment

Figure 12:
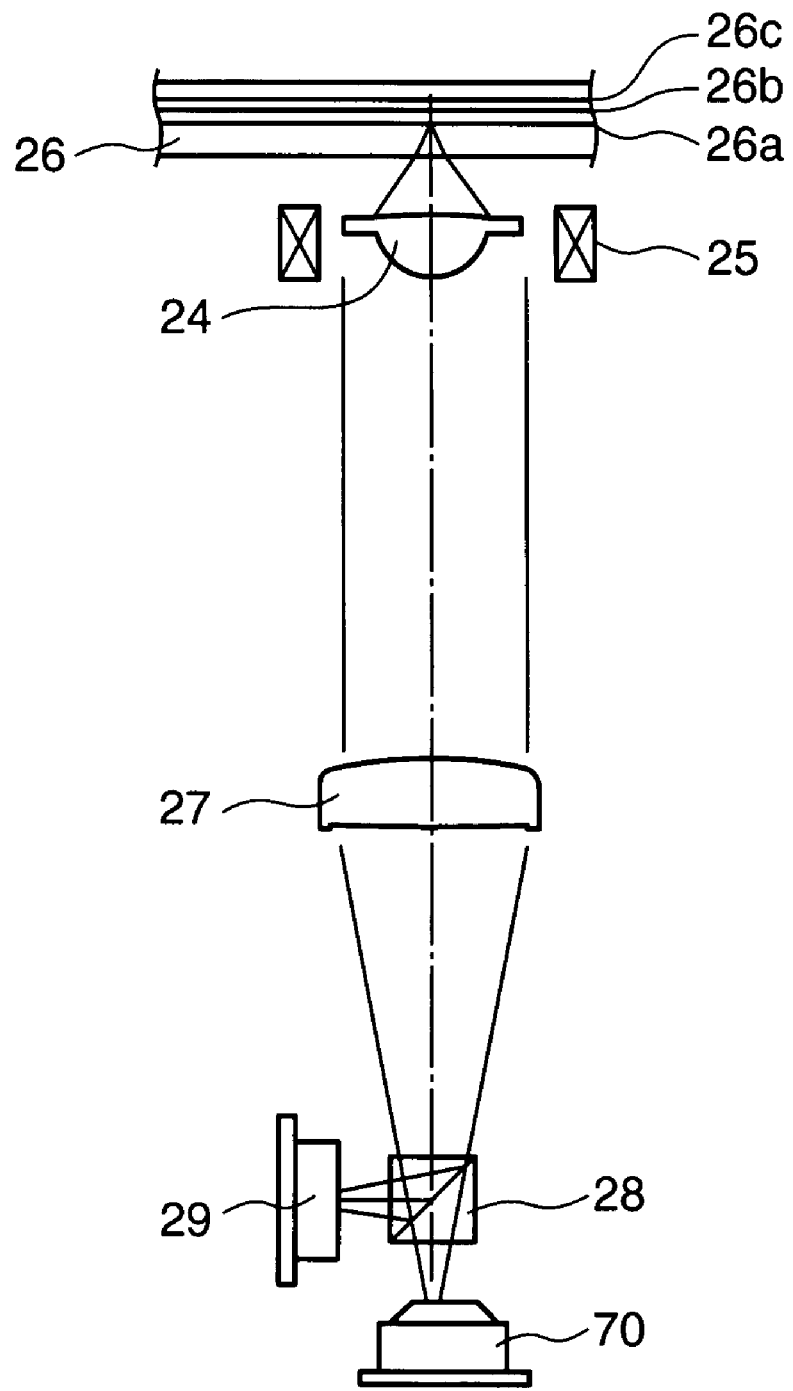
FIG. 12 is a construction diagram of an optical head device according to a fourth embodiment of the invention.

Next, an optical head device according to a fourth embodiment of the present invention is described. FIG. 12 is a construction diagram of the optical head device according to the fourth embodiment of the present invention. In FIG. 12, the same elements as in FIG. 1 are identified by the same reference numerals and are not described. The optical head device shown in FIG. 12 is provided with an integrated module 70 into which a semiconductor laser and a photodetector element are integrated, and the operation of this embodiment differs from that of the first embodiment in the operation of the integrated module 70. Thus, the operation of the integrated module 70 is described with reference to FIGS. 13 and 14.

Figure 13:
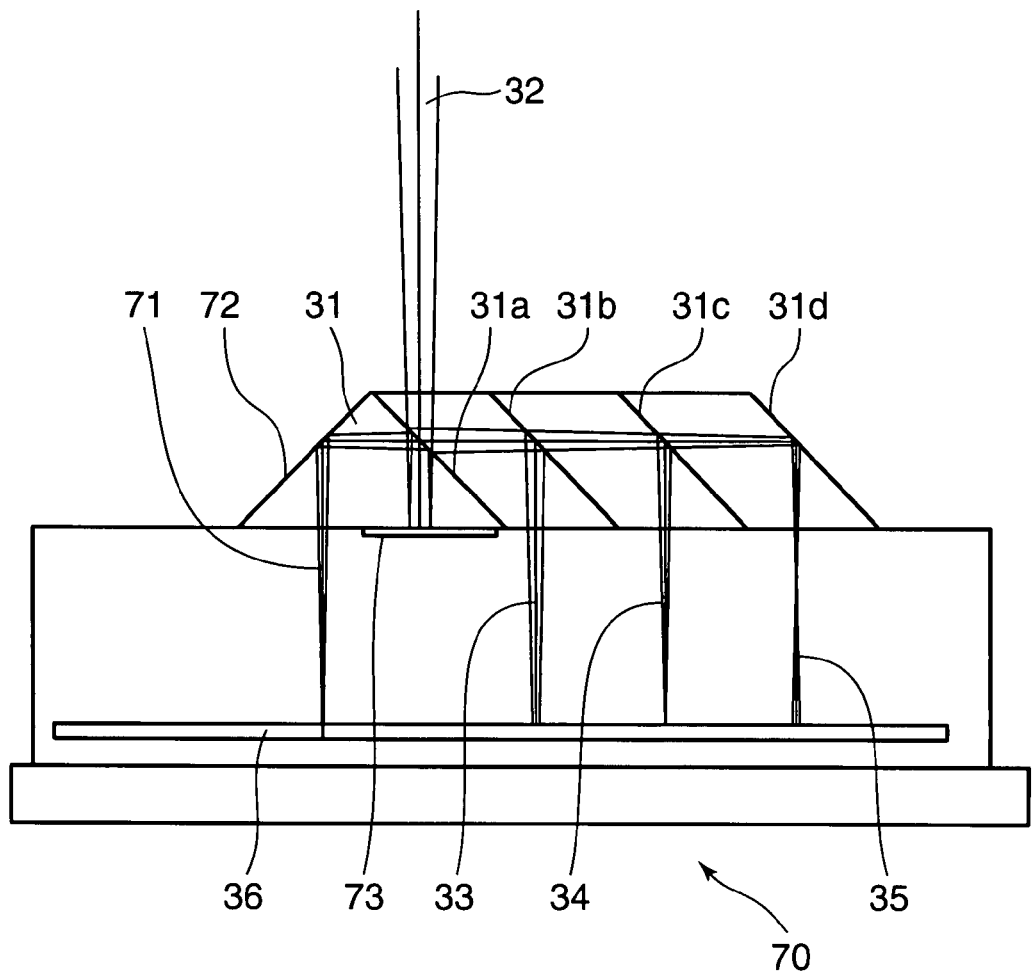
FIG. 13 is a section showing the construction of an integrated module shown in FIG. 12.
Figure 14:
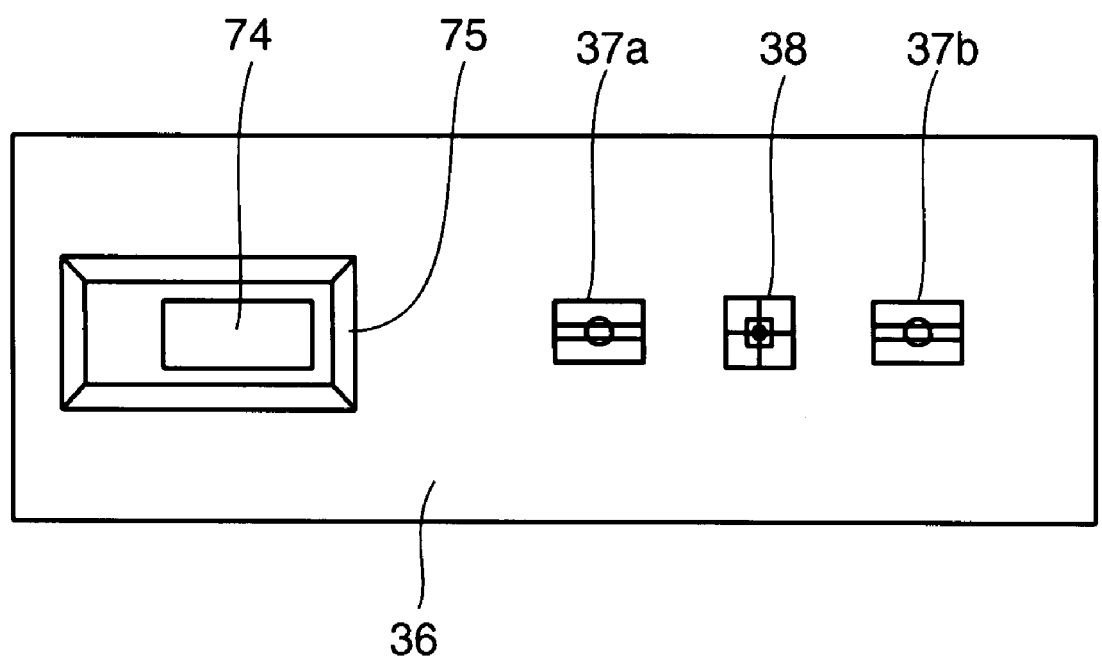
FIG. 14 is a top view of a photodetector element shown in FIG. 13.

FIG. 13 is a section showing the construction of the integrated module 70 shown in FIG. 12, and FIG. 14 is a top view of a photodetector element 36 shown in FIG. 13. In FIGS. 13 and 14, the same elements as those in FIGS. 2 and 3 are identified by the same reference numerals and are not described.

In FIG. 13, the integrated module 70 includes a compound prism 31, a quarter-wave plate 73 and the photodetector 36. The compound prism 31 has reflecting surfaces 72, 31a, 31b, 31c and 31d. The reflecting surface 31a is a polarized light reflecting surface for reflecting an S-polarized light while letting a P-polarized light transmit. In FIG. 14, the photodetector element 36 includes the semiconductor laser 74, a reflecting surface 75, light receiving regions 37a, 37b for focus detection and a light receiving region 38 for RF detection. The reflecting surface 75 is formed by applying anisotropic etching to a silicon substrate as a substrate of the photodetector element 36.

In FIGS. 13 and 14, a laser beam 71 emitted from the semiconductor laser 74 is reflected by the reflecting surfaces 75 and 72 to be incident on the reflecting surface 31a. The arrangement of the semiconductor laser 74 is determined such that the laser beam 71 incident on the reflecting surface 31a becomes an S-polarized light. Since the laser beam 71 is an S-polarized light when being incident on the reflecting surface 31a, it is reflected by the reflecting surface 31a to be incident on the quarter-wave plate 73. A reflection film is formed on one surface of the quarter-wave plate 73, and the laser beam 71 reciprocates in the quarter-wave plate 73, whereby a plane of polarization is rotated by 90° and a P-polarized laser beam transmits through the reflecting surface 31a.

In FIG. 12, the laser beam emitted from the integrated module 70 is reflected by the multilayer optical disc 26 and reciprocally transmits in an unillustrated quarter-wave plate arranged between a collective lens 24 and a detection lens 27, whereby a plane of polarization is rotated by 90°. In FIG. 13, the laser beam 32 incident on the integrated module 70 is reflected by the reflecting surface 31a since being incident on the reflecting surface 31 as an S-polarized light. Methods for detecting a tracking error signal, a focus error signal and an RF signal are not described since being similar to those of the first embodiment.

By the above construction, in this embodiment, by providing the semiconductor laser 74, the light receiving regions 37a, 37b for focus detection and the light receiving region 38 for RF detection on the same substrate, there can be provided an optical head device having a smaller number of parts and a high reliability with smaller displacements of the light source images in response to a temperature change and vibration.

Fifth Embodiment

Figure 15:
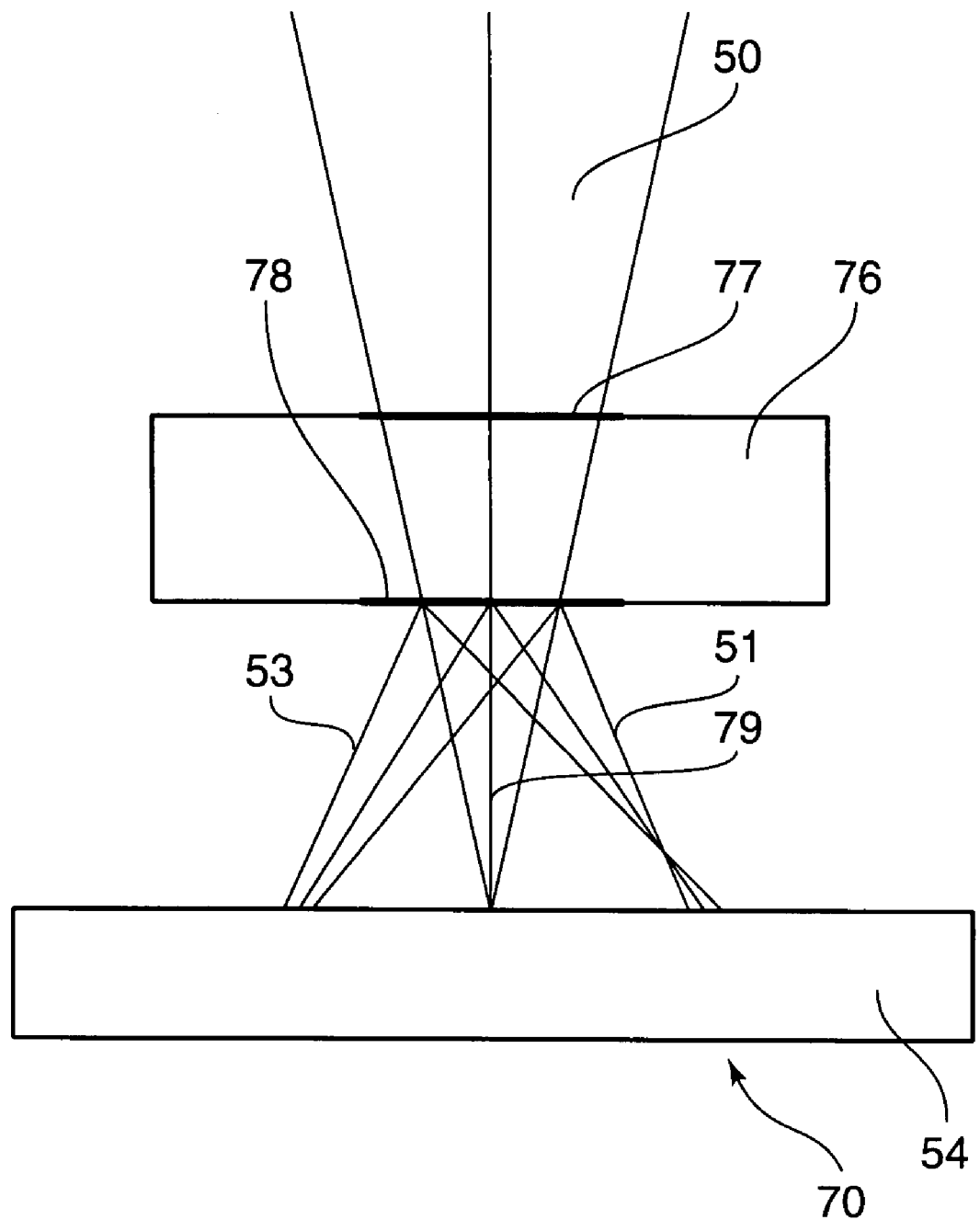
FIG. 15 is a section showing the construction of an integrated module used in an optical head device according to a fifth embodiment of the invention.
Figure 16:
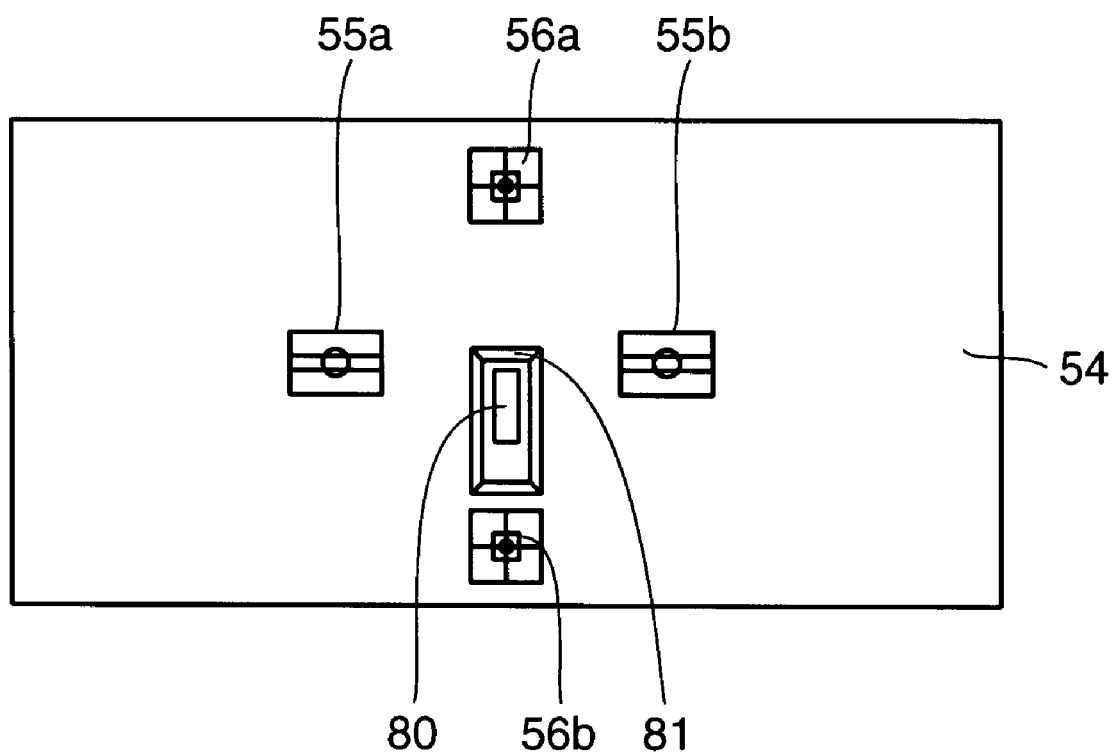
FIG. 16 is a top view of a photodetector element shown in FIG. 15.

Next, an optical head device according to a fifth embodiment of the present invention is described. Since the optical head device according to the fifth embodiment of the present invention differs from the fourth embodiment only in the construction of an integrated module 70, the construction of the integrated module 70 is shown in FIGS. 15 and 16 and the optical head device of this embodiment is described with reference to FIGS. 15 and 16. FIG. 15 is a section showing the construction of the integrated module 70 used in the optical head device according to the fifth embodiment of the present invention, and FIG. 16 is a top view of a photodetector element 54 shown in FIG. 15. In FIGS. 15 and 16, the same elements as those in FIGS. 6 and 7 are identified by the same reference numerals and are not described.

In FIG. 15, the integrated module 70 includes a hologram substrate 76 and the photodetector element 54. In FIG. 16, the photodetector element 54 includes a semiconductor laser 80, a reflecting surface 81, light receiving regions 55a, 55b for focus detection and light receiving regions 56a, 56b for RF detection. The reflecting surface 81 is formed by applying anisotropic etching to a silicon substrate as a substrate of the photodetector element 54.

In FIG. 15, holograms 77 and 78 as diffractive optical elements are formed on the upper and lower surfaces of the hologram substrate 76. The hologram 77 diffracts a laser beam 50 in a direction normal to the plane of FIG. 15, and a laser beam 79 diffracted by the hologram 77 is diffracted in two directions, forward and backward with respect to the plane of FIG. 15, to be incident on the light receiving regions 56a, 56b for RF detection shown in FIG. 16. The hologram 78 has a function of diffracting the laser beam 50 in the plane of FIG. 15 and converging +1$^{st}$-order diffracted lights.

In FIGS. 15 and 16, a laser beam emitted from the semiconductor laser 80 is reflected by the reflecting surface 81 and transmits through the hologram substrate 76. Similar to the fourth embodiment, the laser beam having emerged from the integrated module 70 is reflected by the multilayer optical disc 26 to return to the integrated module 70. A focus error signal detection method is not described since being similar to the one of the second embodiment.

The detection of the RF signal is made by the laser beam 50 being diffracted by the hologram 77 and the diffracted laser beams 79 being incident on the light receiving regions 56a, 56b for RF detection. A signal detection method in the light receiving regions 56a, 56b for RF detection are not described since being the same as described in the first embodiment.

By the above construction, in this embodiment, by providing the semiconductor laser 80, the light receiving regions 55a, 55b for focus detection and the light receiving regions 56a, 56b for RF detection on the same substrate, there can be provided an optical head device having a smaller number of parts and a high reliability with smaller displacements of the light source images in response to a temperature change and vibration.

Sixth Embodiment

Figure 17:
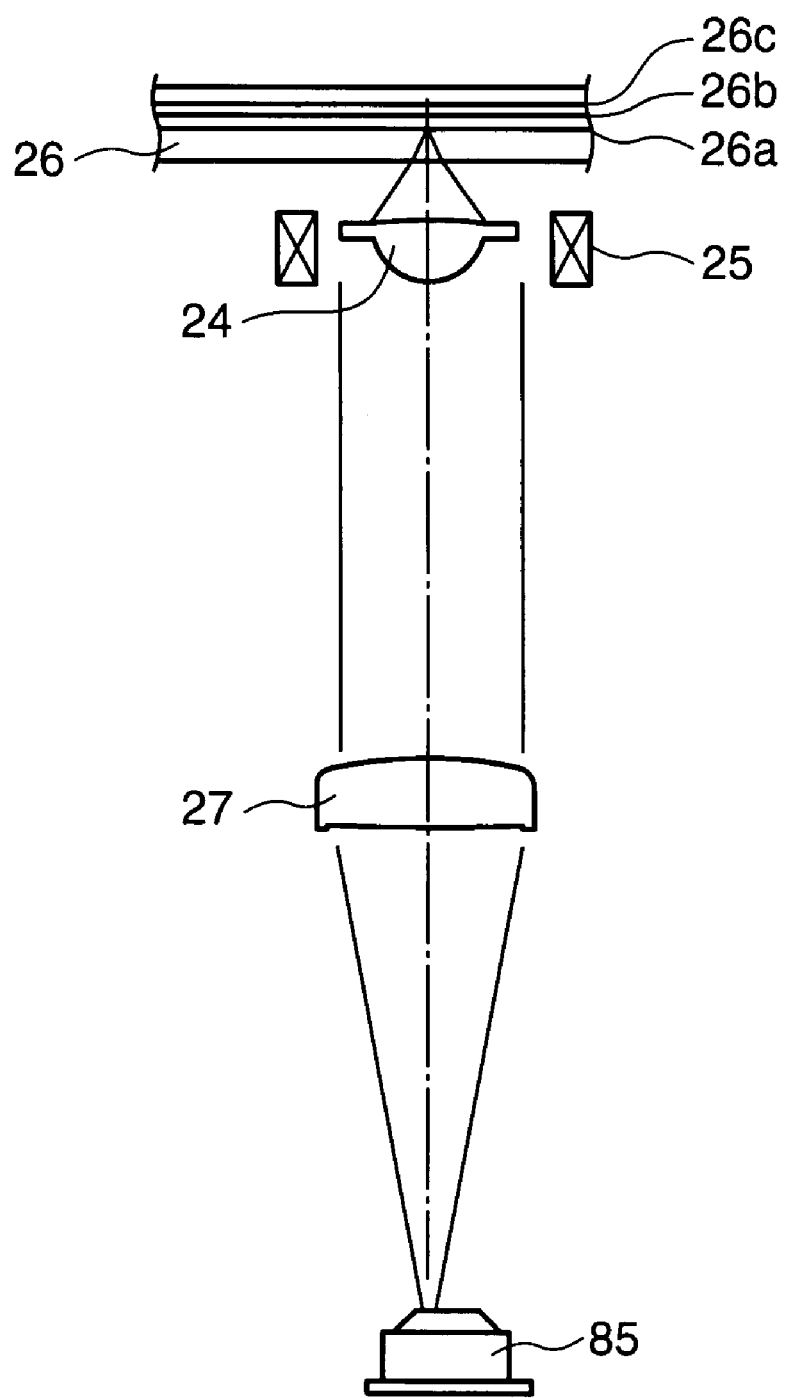
FIG. 17 is a construction diagram of an optical head device according to a sixth embodiment of the invention.

Next, an optical head device according to a sixth embodiment of the present invention is described. FIG. 17 is a construction diagram of the optical head device according to the sixth embodiment of the present invention. In FIG. 17, the same elements as in FIG. 12 are identified by the same reference numerals and are not described.

Figure 18:
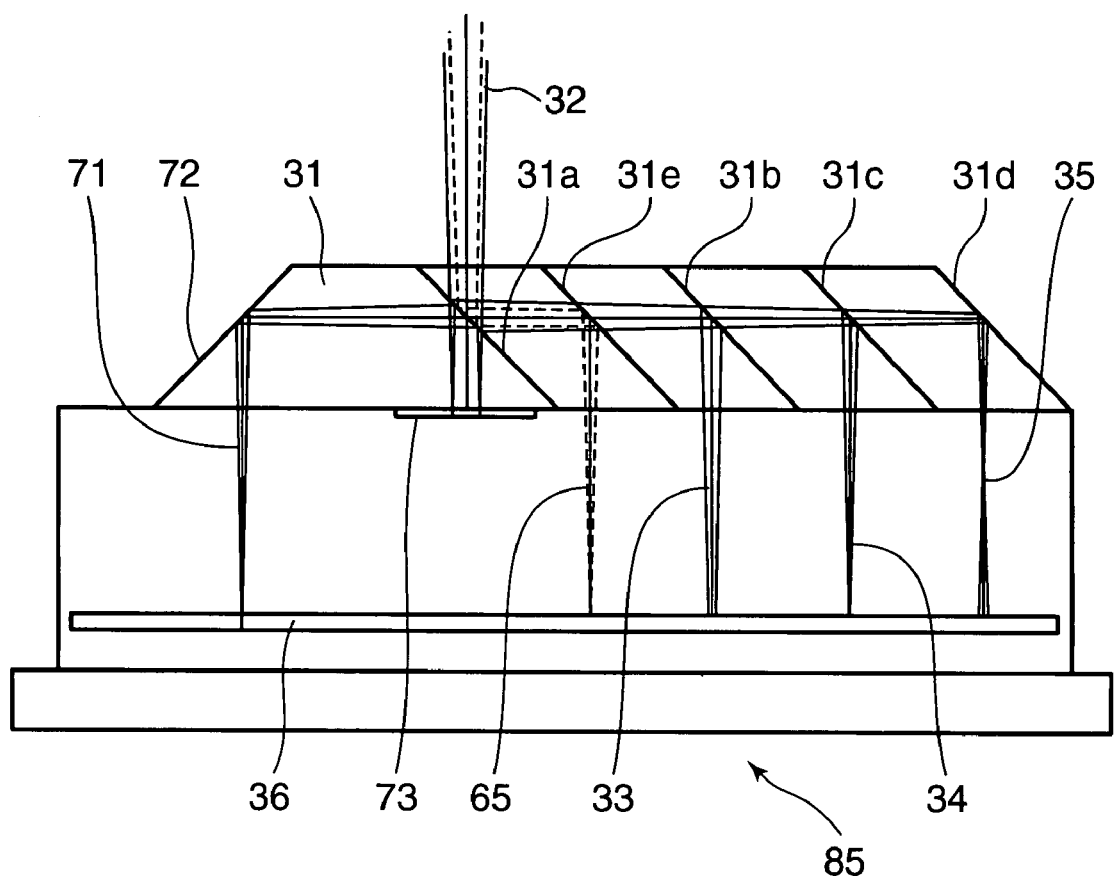
FIG. 18 is a section showing the construction of an integrated module shown in FIG. 17.
Figure 19:
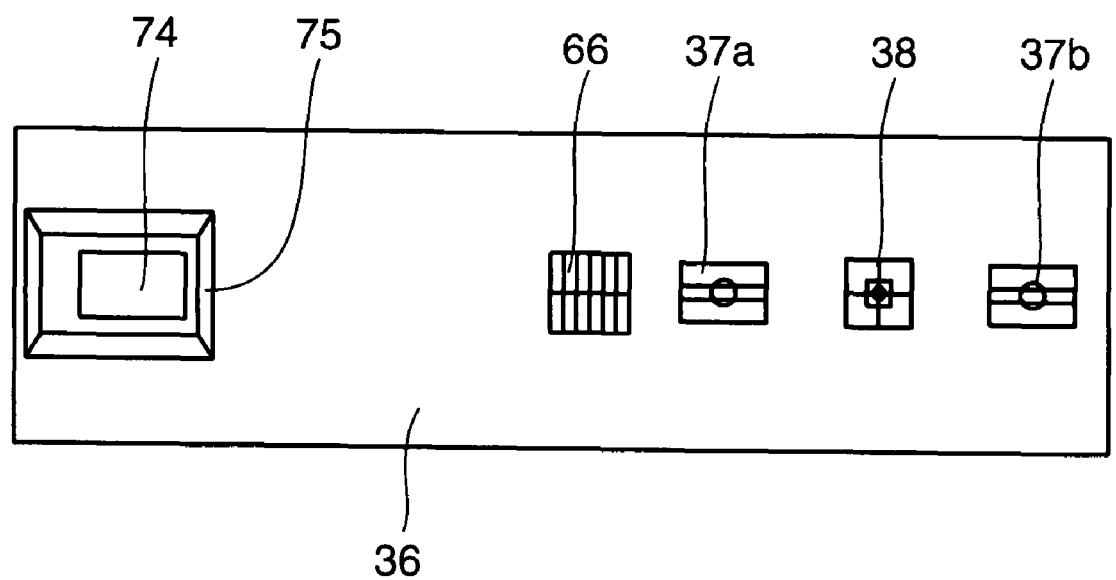
FIG. 19 is a top view of a photodetector element shown in FIG. 18.

In FIG. 17, the optical head device is provided with an integrated module 85, which integrally includes a photodetector and a light source. FIG. 18 is a section showing the construction of the integrated module 85 shown in FIG. 17, and FIG. 19 is a top view of a photodetector element 36 shown in FIG. 18. In FIGS. 17 and 18, the same elements as those in FIGS. 13 and 14 are identified by the same reference numerals and are not described.

In FIG. 18, the integrated module 85 includes a compound prism 31, a quarter-wave plate 73 and the photodetector 36. The compound prism 31 has reflecting surfaces 72, 31a, 31b, 31c, 31d and 31e. The reflecting surface 31a is a polarized light reflecting surface for reflecting an S-polarized light while letting a P-polarized light transmit. The reflecting surface 31e is a partial reflecting surface. In FIG. 19, the photodetector element 36 includes a semiconductor laser 74, a reflecting surface 75, a light receiving region 66 for tracking detection, light receiving regions 37a, 37b for focus detection and a light receiving region 38 for RF detection. The reflecting surface 75 is formed by applying anisotropic etching to a silicon substrate as a substrate of the photodetector element 36. The light receiving region 66 for tracking detection is formed on the photodetector element 36 and divided into strip-shaped regions.

A laser beam 65 shown in FIG. 18 is a laser light obtained by collecting lights diffracted and reflected from an information layer 26b by means of a detection lens 27 when the focus of the collective lens 24 is adjusted, for example, to the information layer 26a in FIG. 17. At this time, a laser beam 32 is a laser beam obtained by collecting the reflected light from the information layer 26a by means of the detection lens 27.

In FIGS. 18 and 19, a laser beam 71 emitted from the semiconductor laser 74 is reflected by the reflecting surfaces 75 and 72 to be incident on the reflecting surface 31a. The arrangement of the semiconductor laser 74 is determined such that the laser beam 71 incident on the reflecting surface 31a becomes an S-polarized light. Since the laser beam 71 is an S-polarized light when being incident on the reflecting surface 31a, it is reflected by the reflecting surface 31a to be incident on the quarter-wave plate 73. A reflection film is formed on one surface of the quarter-wave plate 73, and the laser beam 71 reciprocates in the quarter-wave plate 73, whereby a plane of polarization is rotated by 90° and a P-polarized laser beam transmits through the reflecting surface 31a.

In FIG. 17, the laser beam emitted from the integrated module 85 is reflected by the multilayer optical disc 26 and reciprocally transmits in an unillustrated quarter-wave plate arranged between the collective lens 24 and the detection lens 27, whereby a plane of polarization is rotated by 90°. In FIG. 18, the laser beam 32 incident on the integrated module 85 is reflected by the reflecting surface 31a since being incident on the reflecting surface 31 as an S-polarized light. Methods for detecting a focus error signal, a tracking error signal and an RF signal are not described since being similar to those of the third embodiment.

By the above construction, in this embodiment, by providing the semiconductor laser 74, the light receiving regions 37a, 37b for focus detection, the light receiving region 38 for RE detection and the light receiving region 66 for tracking detection on the same substrate, there can be provided an optical head device having a smaller number of parts and a high reliability with smaller displacements of the light source images in response to a temperature change and vibration.

Seventh Embodiment

Figure 20:
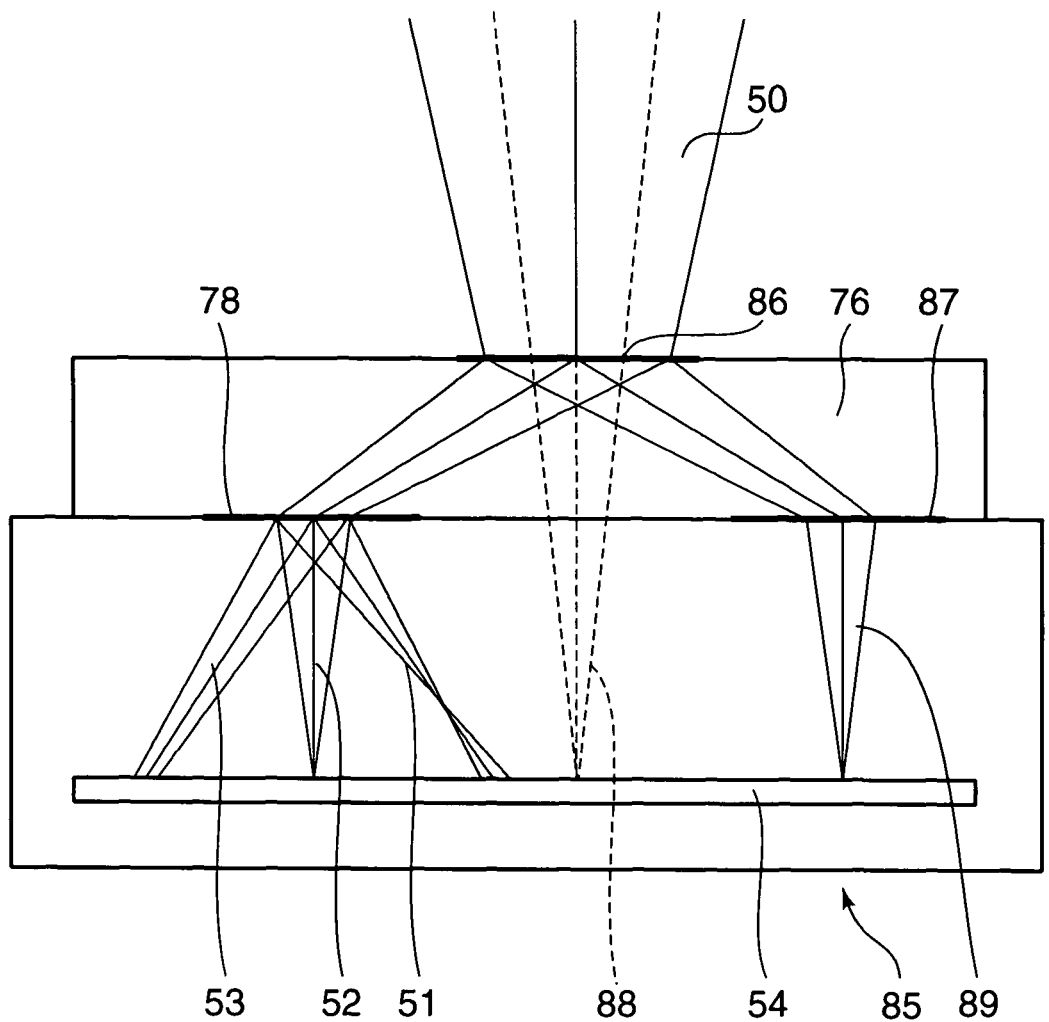
FIG. 20 is a section showing the construction of an integrated module used in an optical head device according to a seventh embodiment of the invention.
Figure 21:
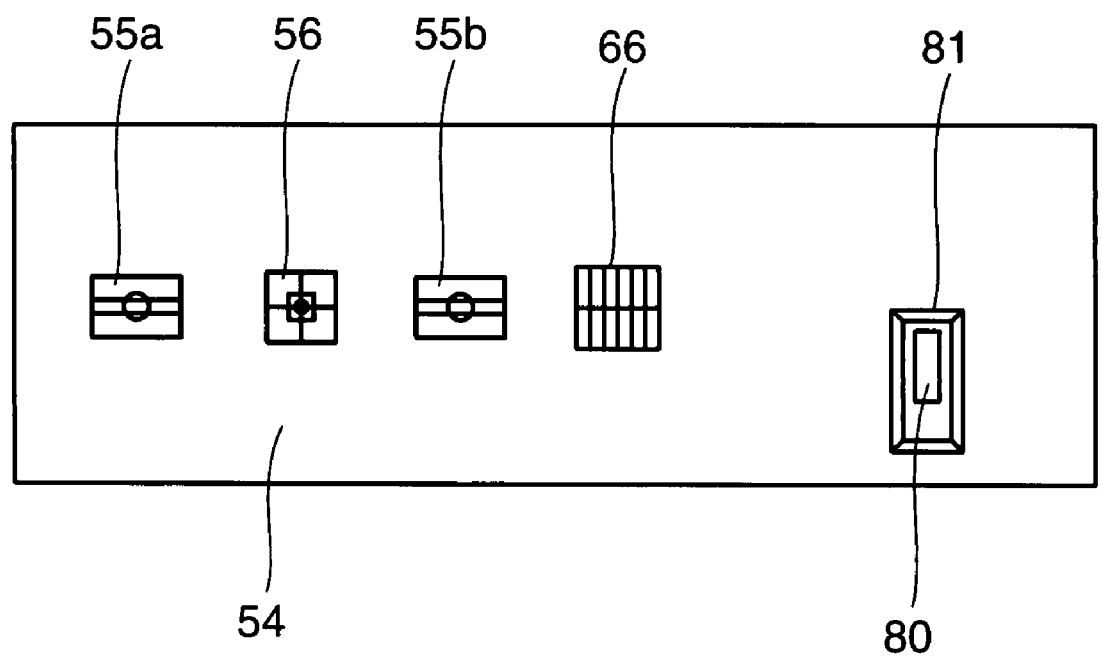
FIG. 21 is a top view of a photodetector element shown in FIG. 20.

Next, an optical head device according to a seventh embodiment of the present invention is described. Since the optical head device according to the seventh embodiment of the present invention differs from the sixth embodiment only in the construction of an integrated module 85, the construction of the integrated module 85 is shown in FIGS. 20 and 21 and the optical head device of this embodiment is described with reference to FIGS. 20 and 21. FIG. 20 is a section showing the construction of the integrated module 85 used in the optical head device according to the seventh embodiment of the present invention, and FIG. 21 is a top view of a photodetector element 54 shown in FIG. 20. In FIGS. 20 and 21, the same elements as those in FIGS. 15 and 16 are identified by the same reference numerals and are not described.

In FIG. 20, the integrated module 85 includes a hologram substrate 76 and the photodetector element 54. In FIG. 21, the photodetector element 54 includes a semiconductor laser 80, a reflecting surface 81, a light receiving region 66 for tracking detection, light receiving regions 55a, 55b for focus detection and a light receiving region 56 for RF detection. The reflecting surface 81 is formed by applying anisotropic etching to a silicon substrate as a substrate of the photodetector element 54.

In FIG. 20, holograms 86, 78 and 87 as diffractive optical elements are formed on the upper and lower surfaces of the hologram substrate 76. The hologram 87 has a diffraction function. A laser beam 89 emitted from the semiconductor laser 80 is incident on the hologram 87 to be diffracted after being reflected by the reflecting surface 81, and is further incident on the hologram 86 to be diffracted, thereby being focused on, for example, an information layer 26a of a multilayer optical disc 26 shown in FIG. 17 on the same light path as the laser beam 50. The laser beam reflected by the multilayer optical disc 26 returns to the integrated module 85.

The hologram 86 diffracts the laser beam 50 collected by the detection lens 27, whereby $0^{th}$-order diffracted light is caused to transmit and $+1^{st}$-order diffracted light is caused to be incident on the hologram 78. The hologram 78 has a function of diffracting the laser beam 50 in the plane of FIG. 20, converging $+1^{st}$-order diffracted light and diffusing $-1^{st}$-order diffracted light. A diffracted light 51 is the $+1^{st}$-order diffracted light diffracted by the hologram 78, a diffracted light 52 is the $0^{th}$-order light having transmitted through the hologram 78, and a diffracted light 53 is the $-1^{st}$-order diffracted light diffracted by the hologram 78.

In FIG. 21, the light receiving regions 55a, 55b for focus detection receive the $-1^{st}$-order diffracted light 53 and $+1^{st}$-order diffracted light 51, respectively. The light receiving region 56 for RF detection receives the $0^{th}$-order diffracted light 52. The light receiving region 56 for RF detection is substantially arranged at a focus point position of the laser beam 50 on the light path, the light receiving region 55a for focus detection is substantially arranged at a position closer to a collective lens 24 than the focus position of the laser beam 50 on the light path, and the light receiving region 55b for focus detection is substantially arranged at a position symmetrical with the light receiving region 55a for focus detection on the light path with respect to the focus point position of the laser beam 50.

It should be noted that methods for detecting a focus error signal and a RF signal are not described since being similar to those of the second embodiment. Further, the construction of the light receiving region 56 for RF detection is the same as that of the light receiving region 38 for RF detection according to the first embodiment, and it is similar to the first embodiment and is not described that detection is made by the SSD method as the focus error detection method and interlayer crosstalk is reduced by reducing a light receiving region 39 of the light receiving region 56 for RF detection.

A laser beam 88 shown in FIG. 20 is a laser beam obtained by collecting lights diffracted and reflected from the information layer 26b by means of the detection lens 27 when the focus of the collective lens 24 is adjusted, for example, to the information layer 26a in FIG. 17. At this time, the laser beam 50 is a laser beam obtained by collecting the reflected light from the information layer 26a by means of the detection lens 27.

Here, by causing a difference between a light path length from the hologram 86 to the light receiving region 66 for tracking detection and the one from the hologram 86 to the light receiving region 56 for RF detection to coincide with a product of a longitudinal magnification of the optical system comprised of the collective lens 24 and the detection lens 27 and an interval between the information layers of the multilayer optical disc 26, the laser beam 88 is collected on the light receiving region 66 for tracking detection to form an image of the information layer 26b when the laser beam 50 reflected from the information layer 26a is collected on the light receiving region 56 for RF detection. Accordingly, a tracking error signal is detected by the principle described in the third embodiment since the laser beam 88 having transmitted through the hologram 86 is imaged on the light receiving region 66 for tracking detection.

By the above construction, in this embodiment, by providing the semiconductor laser 80, the light receiving regions 55a, 55b for focus detection, the light receiving region 56 for RE detection and the light receiving region 66 for tracking detection on the same substrate, there can be provided an optical head device having a smaller number of parts and a high reliability with smaller displacements of the light source images in response to a temperature change and vibration.

Eighth Embodiment

Figure 22:
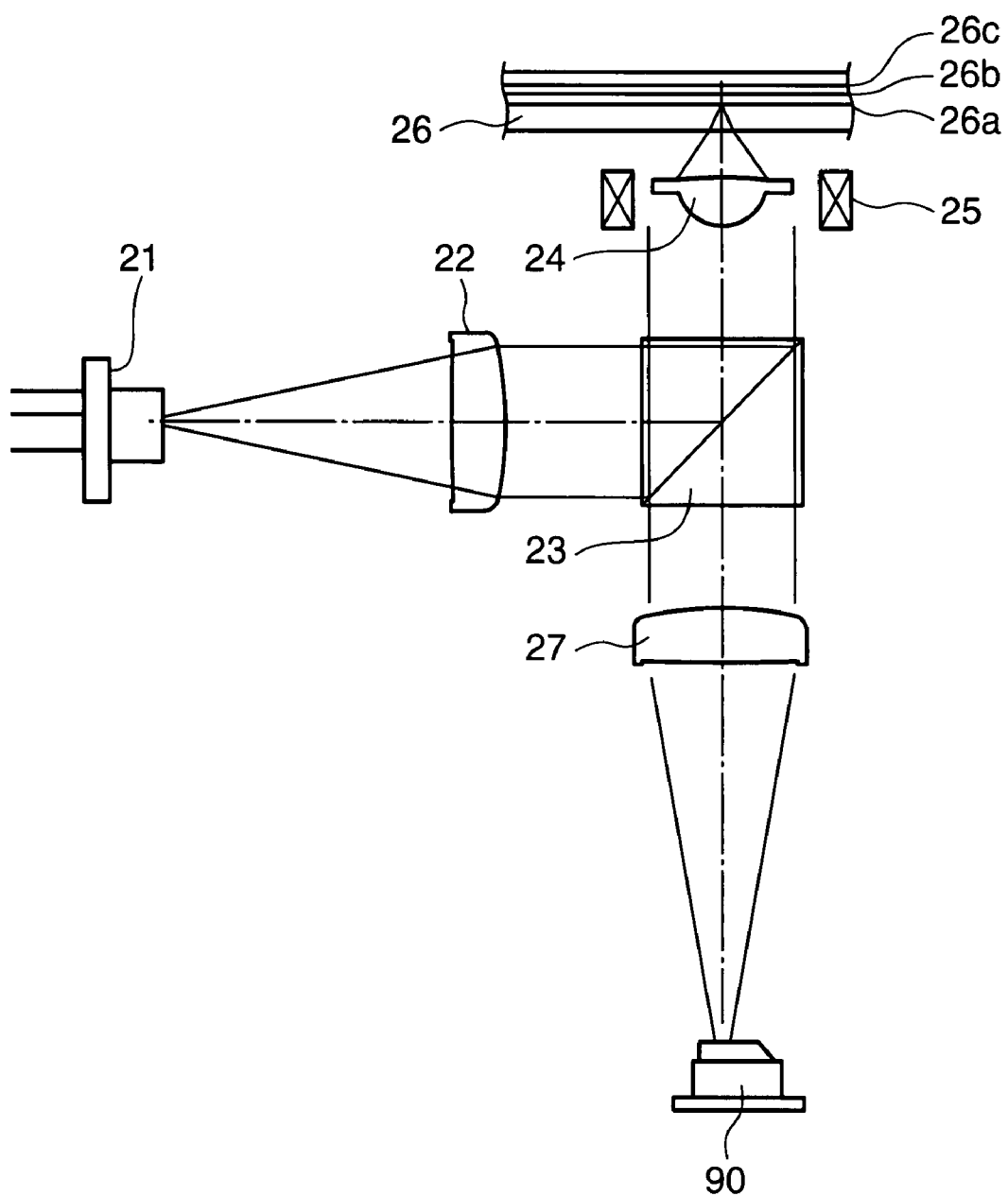
FIG. 22 is a construction diagram of an optical head device according to an eighth embodiment of the invention.

Next, an optical head device according to an eighth embodiment of the present invention is described. FIG. 22 is a construction diagram of the optical head device according to the eighth embodiment of the present invention. In FIG. 22, the same elements as in FIG. 1 are identified by the same reference numerals and are not described.

In FIG. 22, a laser beam emitted from a semiconductor laser 21 has a light path thereof bent by a beam splitter 23 to be incident on a collective lens 24 after being collimated by a collimator lens 22. The collective lens 24 is driven by an actuator 25 and focuses the laser beam on one of information layers 26a, 26b and 26c of a multilayer optical disc 26. The laser beam reflected from the multilayer optical disc 26 transmits through the collective lens 24 and the beam splitter 23 and is collected by the detection lens 27. A photodetector 90 detects focus and tracking error signals and an RF signal from the reflected light from the multilayer optical disc 26. An RF signal detection method is not described since being the same as described in the first embodiment.

Figure 23:
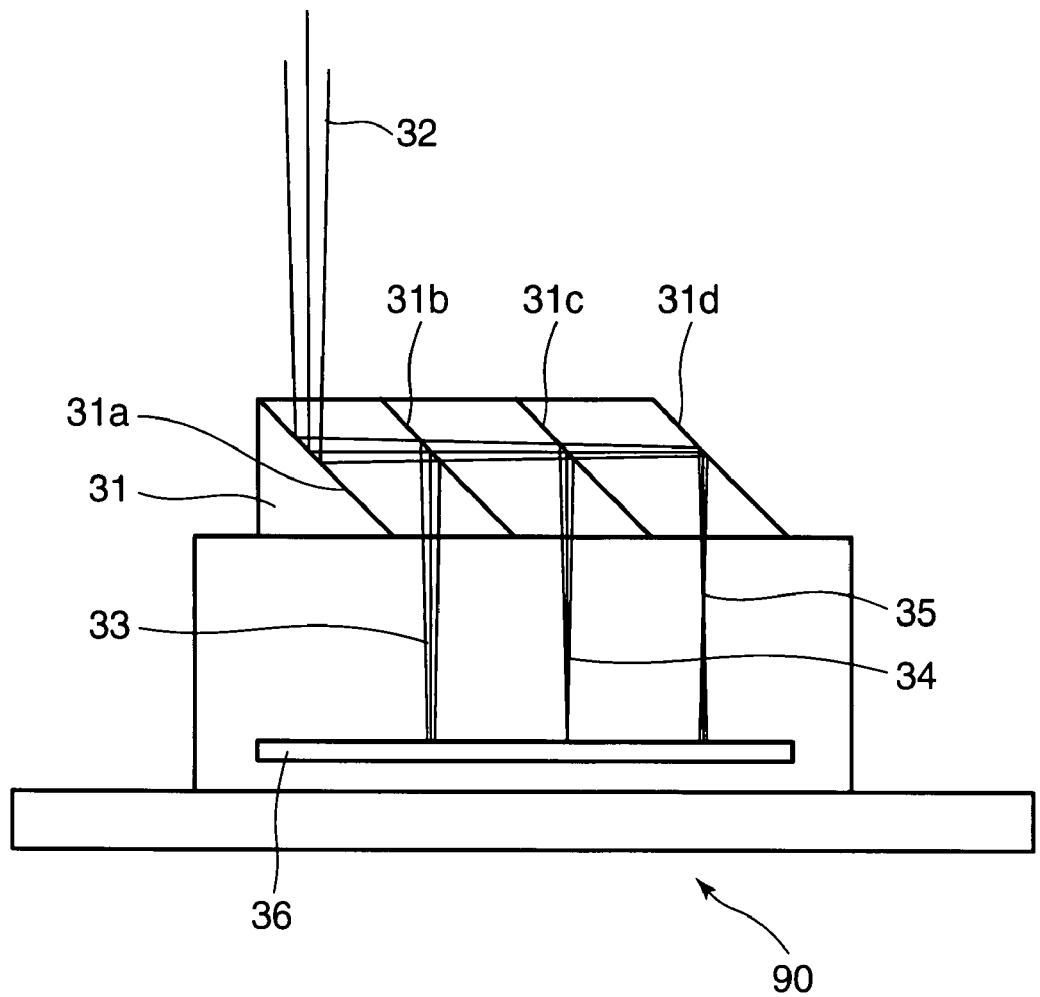
FIG. 23 is a section showing the construction of a photodetector shown in FIG. 22.
Figure 24:
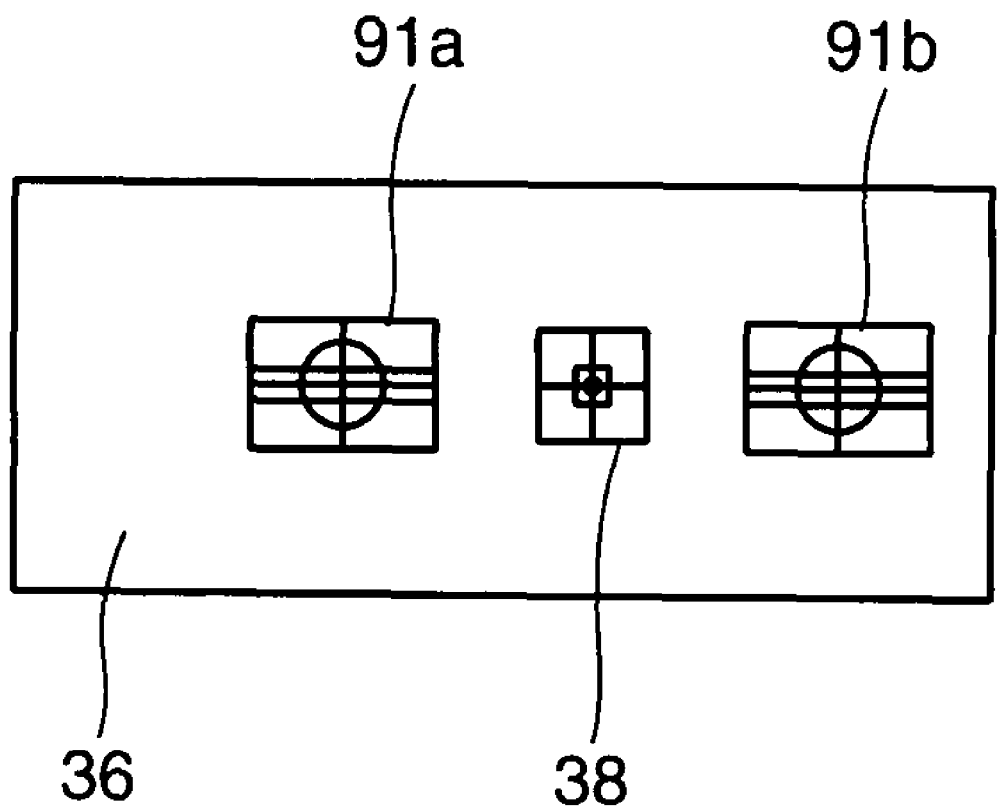
FIG. 24 is a top view of a photodetector element shown in FIG. 23.

The optical head device of this embodiment differs from the one shown in FIG. 1 in that the photodetectors 29, 30 are combined into one photodetector 90. FIG. 23 is a section showing the construction of the photodetector 90 shown in FIG. 22, and FIG. 24 is a top view of a photodetector element 36 shown in FIG. 23. In FIGS. 23 and 24, the same elements as those in FIGS. 2 and 3 are identified by the same reference numerals and are not described.

In FIG. 23, the photodetector 90 includes a compound prism 31 and the photodetector element 36, wherein the compound prism 31 is constructed as in the first embodiment. In FIG. 24, the photodetector element 36 has light receiving regions 91a, 91b for focus and tracking detection and a light receiving region 38 for RF detection. Each of the light receiving regions 91a, 91b for focus and tracking detection is formed by a photodetector element divided into eight regions.

Figure 25:
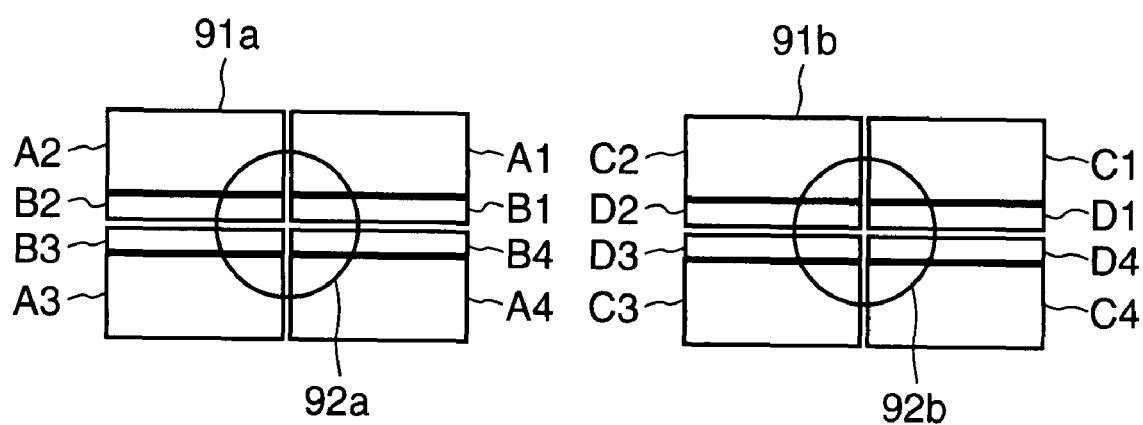
FIG. 25 is a top view showing the construction of light receiving regions for focus and tracking detection shown in FIG. 24.

Next, focus and tracking error signals detection method is described. FIG. 25 is a top view showing the construction of the light receiving regions 91a, 91b for focus and tracking detection without showing the light receiving region 38 for RF detection unnecessary for the description of the focus and tracking.

In FIG. 25, the light receiving region 91a for focus and tracking detection is made up of eight photodetector elements A1 to A4, B1 to B4. The eight photodetector elements A1 to A4, B1 to B4 are formed by dividing the rectangular light receiving region 91a for focus and tracking detection in horizontal and vertical directions to form quarter regions and dividing each quarter region in horizontal direction into two regions such that the inner region is smaller than the outer region. The photodetector elements A1, A2, the photodetector elements B1 to B4 and the photodetector elements A3, A4 correspond to the three divided regions of the light receiving region 37a for photodetector shown in FIG. 3, and the light receiving region 91b for focus and tracking detection is constructed similar to the light receiving region 91a for focus and tracking detection. Spots 92a, 92b are respectively laser beam spots incident on the light receiving regions 91a, 91b for focus and tracking detection.

If outputs of the photodetector elements A1 to A4, B1 to B4, C1 to C4 and D1 to D4 forming the light receiving regions 91a, 91b for focus and tracking detection are expressed by A1 to A4, B1 to B4, C1 to C4 and D1 to D4, a focus error signal is obtained from a difference between (A1+A2+A3+A4+D1+D2+D3+D4) and (B1+B2+B3+B4+C1+C2+C3+C4) by the known SSD method. The tracking error signal is obtained from a difference between (C1+C4+D1+D4) and (C2+D2+D3+C3) or a difference between (A1+A4+B1+B4) and (A2+A3+B2+B3) by the known pull-push method and is obtained from a phase difference between (C1+C3+D1+D3) and (C2+C4+D2+D4) or a phase difference between (A1+A3+B1+B3) and (A2+A4+B2+B4) by the known phase difference method.

Since the spots 92a, 92b are symmetrically positioned in an optical axis direction with respect to the focus of the laser beam 32, brightness patterns in the spots are point-symmetrical. Accordingly, a difference between (A1+A4+B1+B4+C2+D2+D3+C3) and (A2+A3+B2+B3+C1+C4+D1+D4) may be used by the push-pull method, and a phase difference between (A1+A3+B1+B3+C1+C3+D1+D3) and (A2+A4+B2+B4+C2+C4+D2+D4) may be used by the phase difference method.

At this time, images of reflected lights from the information layers other than the recording/reproduction layer on the light receiving regions 91a, 91b for focus and tracking detection are not point-symmetrical. Thus, a good tracking error signal with less influence of the reflected lights from the information layers other than the recording/reproduction layer can be obtained by obtaining a tracking error signal from signals from both light receiving regions 91a, 91b for focus and tracking detection.

By the above construction, in this embodiment, the focus and tracking error signals can be obtained based on the signals from the information layers with a smaller number of parts, wherefore more accurate following capacity can be obtained. Although the compound prism is used as a light splitting element in the photodetector 90 of the optical head device of this embodiment, a hologram may be used.

Ninth Embodiment

Figure 26:
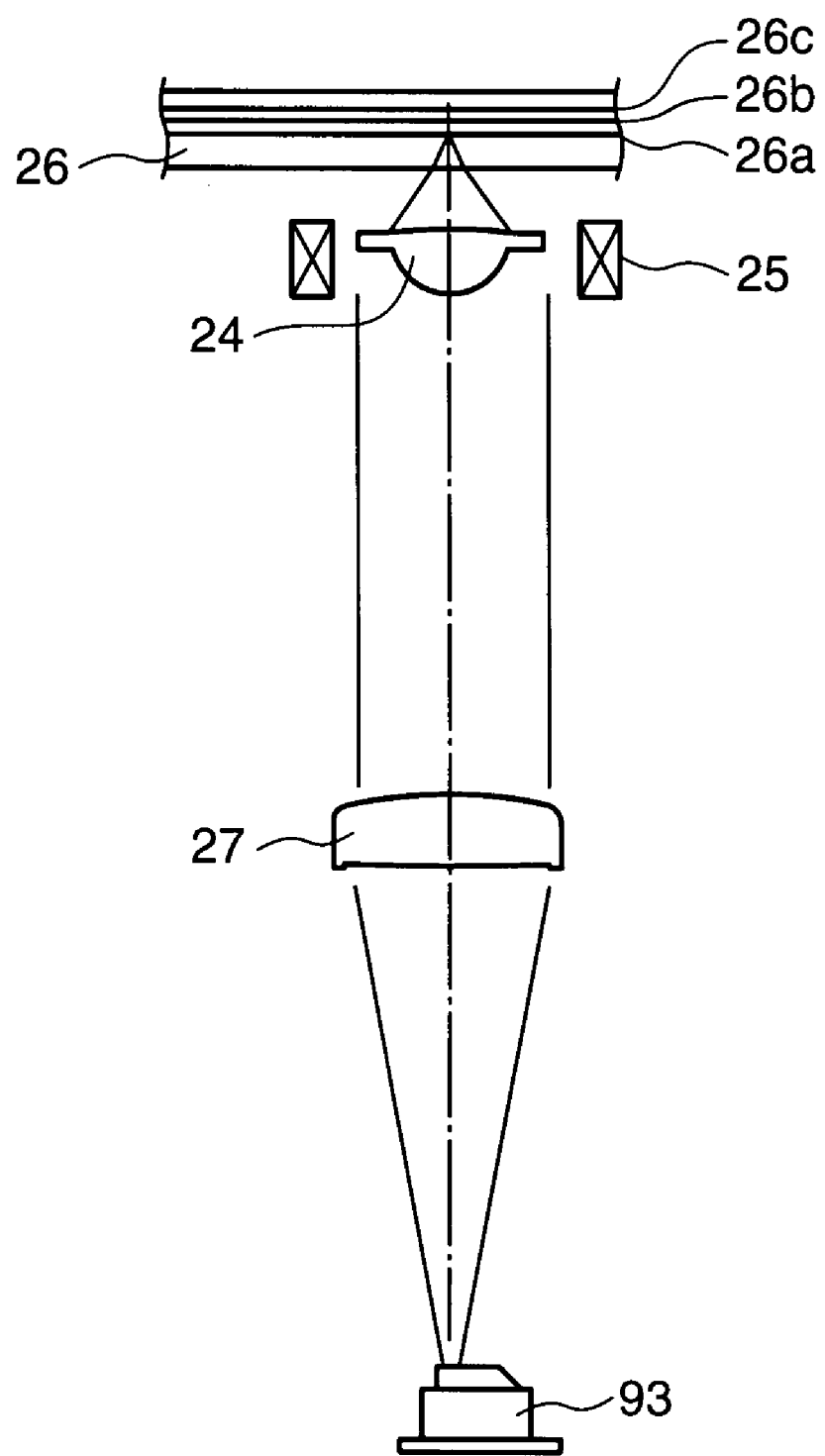
FIG. 26 is a construction diagram of an optical head device according to a ninth embodiment of the invention.

Next, an optical head device according to a ninth embodiment of the present invention is described. FIG. 26 is a construction diagram of the optical head device according to the ninth embodiment of the present invention. In FIG. 26, the same elements as in FIG. 1 are identified by the same reference numerals and are not described.

Figure 27:
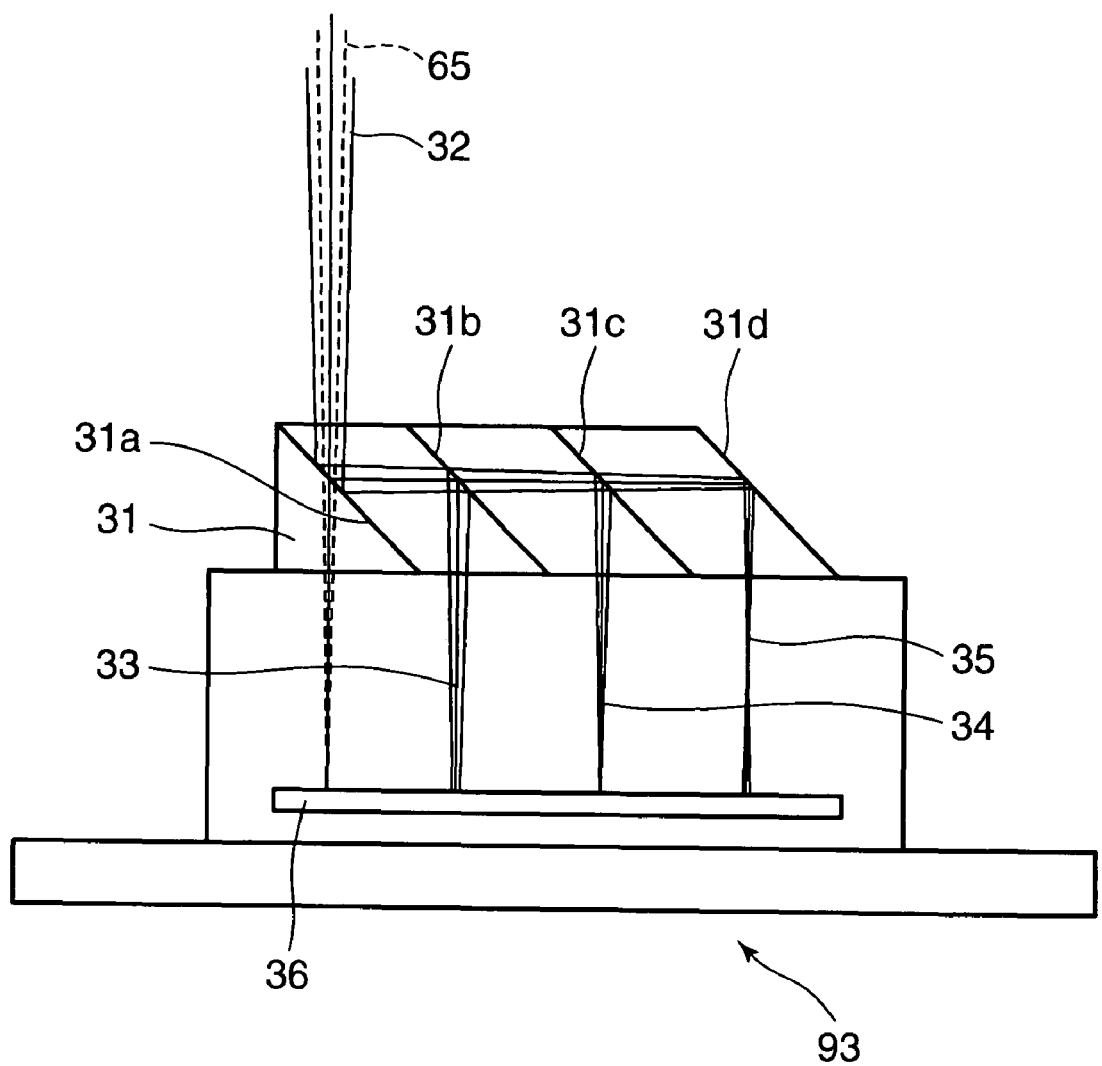
FIG. 27 is a section showing the construction of an integrated module shown in FIG. 26.
Figure 28:
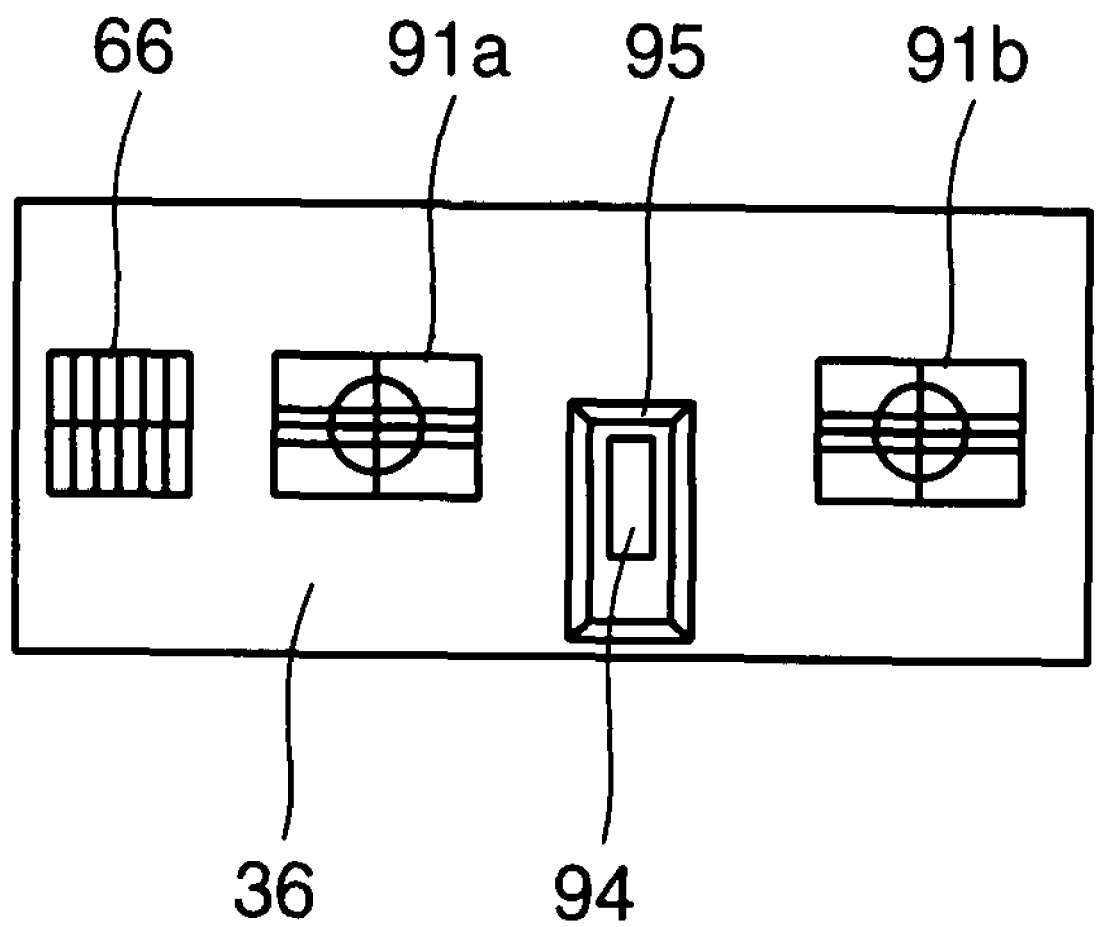
FIG. 28 is a top view of a photodetector element shown in FIG. 27.

The optical head device shown in FIG. 26 is provided with an integrated module 93 into which a photodetector element and a light source are integrated. FIG. 27 is a section showing the construction of the integrated module 93 shown in FIG. 26, and FIG. 28 is a top view of a photodetector element 36 shown in FIG. 27. In FIGS. 27 and 28, the same elements as those in FIGS. 10 and 11 and FIGS. 23 and 24 are identified by the same reference numerals and are not described.

In FIG. 27, the integrated module 93 includes a compound prism 31 and the photodetector 36. In FIG. 28, the photodetector element 36 includes a semiconductor laser 94, a reflecting surface 95, a light receiving region 66 for tracking detection and light receiving regions 91a, 91b for focus and tracking detection. The reflecting surface 95 is formed by applying anisotropic etching to a silicon substrate as a substrate of the photodetector element 36.

In FIG. 27, a laser beam emitted from the semiconductor laser 94 passes along the same light path as a laser beam 34 and is incident on a multilayer optical disc 26 shown in FIG.

26 to be reflected, thereby returning to the integrated module 93. Since methods for detecting a focus error signal and a tracking error signal from a recording/reproduction layer are as described in the eighth embodiment and a method for detecting a tracking error signal from an information layer adjacent to the recording/reproduction layer is as described in the third embodiment, they are not described.

According to an RF signal detection method, an RF signal is detected utilizing such a property that, when the laser beam 34 returns to the semiconductor laser 94 in FIG. 27, a state of oscillation of the semiconductor laser 94 varies with the intensity of a return light as well-known. Specifically, the laser beam 34 reflected by a reflecting surface 31c of the compound prism 31 is incident on the semiconductor laser 94, whereby the semiconductor laser 94 also functions as a light receiving region for detecting the RF signal from the multilayer optical disc 26. For example, if a drive current is controlled to oscillate the semiconductor laser 94 with a constant output, the drive current decreases when the return light is strong. Thus, the RF signal can be detected based on the variation of the drive current.

By the above construction, in this embodiment, the RF signal is detected from the semiconductor laser 94 by providing the semiconductor laser 94, the light receiving regions 91a, 91b for focus and tracking detection and the light receiving region 66 for tracking detection on the same substrate, wherefore there can be provided an optical head device having a smaller number of parts and a high reliability with smaller displacements of the light source images in response to a temperature change and vibration.

If it is not necessary to detect the tracking error signals from the information layer adjacent to the recording/reproduction layer, the light receiving region 66 for tracking detection is not necessary. Although the compound prism is used as a light splitting element in the photodetector 93 of the optical head device of this embodiment, a hologram may be used. Further, the light source and the light receiving regions can be arbitrarily combined in the above respective embodiments. For example, the semiconductor laser 94 of the ninth embodiment may be used as the light receiving region for RF detection according to the first to eighth embodiments.

Tenth Embodiment

Figure 29:
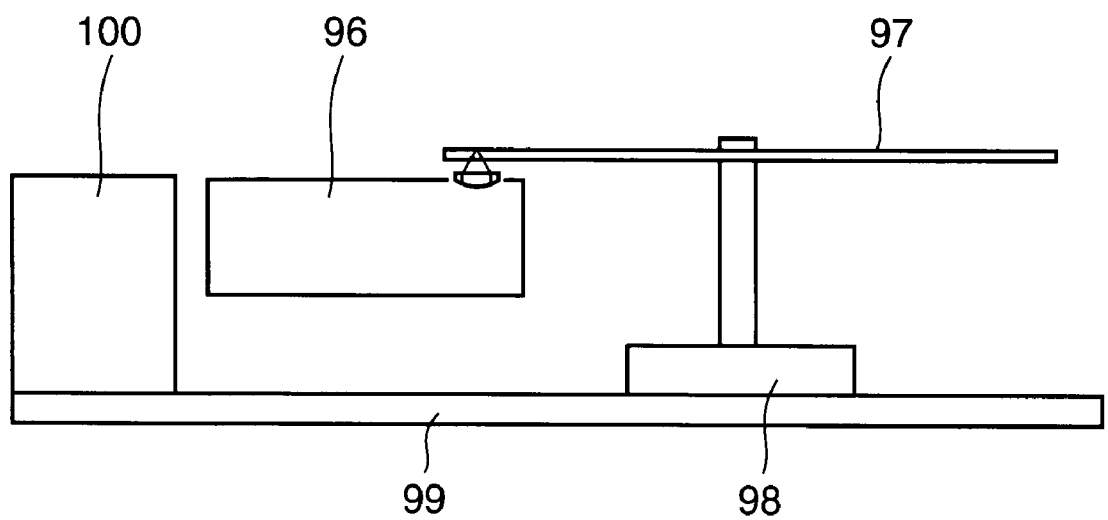
FIG. 29 is a diagram showing the construction of an optical information processor according to a tenth embodiment of the invention.
Figure 30:
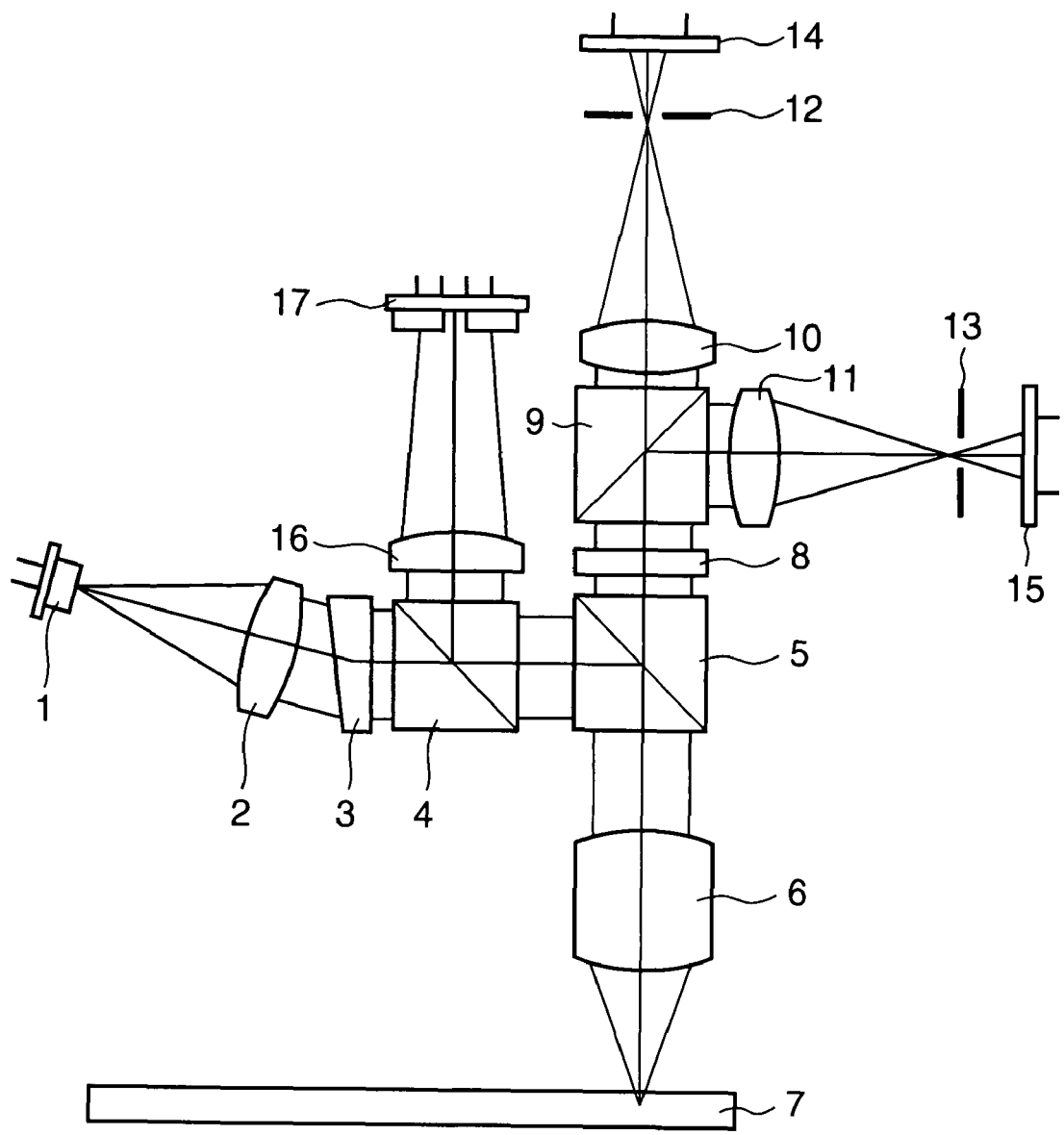
FIG. 30 is a diagram showing the construction of a conventional optical head device.

Next, an optical information processor using the optical head device according to any one of the above first to ninth embodiments is described as a tenth embodiment of the present invention. FIG. 29 is a diagram showing the construction of the optical information processor according to the tenth embodiment of the present invention.

In FIG. 29, the optical information processor is provided with an optical head device 96, a motor 98, a circuit board 99 and a power supply 100. The optical head device according to any one of the first to ninth embodiments is used as the optical head device 96. An optical disc 97 is the one which is an optical recording medium and includes a plurality of information layers. The motor 98 is a rotating mechanism for the optical disc 97, and supports and rotates the optical disc 97.

The optical head device 96 sends a signal corresponding to the positional relationship with the optical disc 97 to the circuit board 99. The circuit board 99 calculates this signal and outputs a signal for minutely moving the optical head device 96 or a collective lens in the optical head device 96, thereby controlling a focus servo driving mechanism (not shown) and a tracking servo driving mechanism (not shown) to perform a focus servo and a tracking servo to the optical disc 97. Further, the circuit board 99 includes an electrical circuit for reading, writing or deleting information by means of the optical head device 96, and reads, writes or deletes information in or from the optical disc 97. The power supply 100 is comprised of an internal power supply or a connection portion with an external power supply, and supplies electric power to the driving mechanism, focus servo driving mechanism and tracking servo driving mechanism of the optical head device 96, the motor 98 and the circuit board 99. It does not matter at all even if a power supply or a connection terminal with an external power supply is provided in the respective driving circuits.

By the above construction, any one of the optical head devices according to the first to ninth embodiments is used in the optical information processor of this embodiment, there are advantages of smaller interlayer crosstalk, good reproducibility and less likelihood of being influenced by vibration and ambient temperature change.

As described above, an optical head device according to one mode of the present invention comprises at least one light source; a collective lens for focusing a light emitted from the light source on an arbitrary recording layer of a multilayer optical disc including a plurality of recording layers; a light splitting element for splitting a reflected light from the arbitrary one of the plurality of recording layers at least into three lights; and a photodetector in which at least three first to third light receiving regions for detecting the split lights split by the light splitting element are provided on one substrate, wherein the light splitting element causes one split light to be incident on the first light receiving region to detect an information signal from the optical disc, the second light receiving region is substantially arranged at a side of the focus position of the split light closer to the collective lens, and the third light receiving region is substantially arranged at a position located at a side of the focus position of the split light opposite to the collective lens and symmetrical with the second light receiving region.

In this optical head device, since one split light is incident on the first light receiving region to detect the information signal from the optical disc, the first light receiving region can be used as a photodetector for information signal detection and since the second light receiving region is provided at the side of the focus position of the split light closer to the collective lens on a light path and the third light receiving region is arranged at the position at the side of the focus position of the split light opposite to the collective lens and symmetrical with the second light receiving region on the light path, the second and third light receiving regions can be used as photodetectors for focus servo. Since the first to third light receiving regions are provided on one substrate, a photodetector for focus servo and a photodetector for information signal detection can be integrated. As a result, highly reliable and small-size optical head device and optical information processor for multilayer optical discs can be realized by using a simple optical system commoditizing a servo optical system and an optical system for information signal detection.

It is preferable that the light splitting element includes a first light splitting element for splitting a reflected light from the recording layer and a second light splitting element for further splitting the reflected light split by the first light splitting element at least into three lights; and that the first light receiving region is provided in the vicinity of the focus position of the split light.

In this case, since the first light receiving region is provided in the vicinity of the focus position of the split light, the information signal of the optical disc can be detected based on an amount of light received by the first light receiving region. As a result, a small-sized and highly reliable optical head device for multilayer optical discs can be realized by integrating the photodetector for focus servo and the photodetector for information signal detection.

It is preferable that the second light splitting element further splits the reflected light split by the first light splitting element at least into four lights; that the photodetector includes a photodetector in which a fourth light receiving region for detecting one split light split by the second light splitting element is provided on one substrate together with the first to third light receiving regions; and that the fourth light receiving region is provided at an imaging position of a reflected light from a recording layer adjacent to the recording layer.

In this case, since the fourth light receiving region is provided at an imaging position of the reflected light from the recording layer adjacent to the recording layer, the fourth light receiving region can be used as a photodetector for tracking servo. As a result, a smaller-sized and more highly reliable optical head device for multilayer optical discs can be realized by integrating the photodetector for tracking servo, the photodetector for focus servo and the photodetector for information signal detection.

The light source is preferably provided on the one substrate together with the light receiving regions.

In this case, since the light source is provided on the one substrate together with the light receiving regions, a smaller-sized and more highly reliable optical head device for multilayer optical discs can be realized by integrating the light source, the photodetector for servo and the photodetector for information signal detection.

The first light receiving region preferably has a size equal to or smaller than the threefold of the Airy disc diameter of the split light.

In this case, since an interval between the recording layers of the multilayer optical disc can be reduced to about the Rayleigh length of the focus spot of the collective lens, a total number of the recording layers can be increased to increase the recording capacity of the optical disc.

The first light receiving region preferably includes a photodetector region having a size equal to or smaller than the threefold of the Airy disc diameter of the split light and a plurality of divided photodetector regions arranged around the photodetector region.

In this case, interlayer crosstalk can be reduced by making the size of the photodetector region smaller and a position error signal of a detection light spot can be obtained based on signals from the plurality of divided photodetector region. Therefore, a displacement of the detection light spot collected on the photodetector area can be precisely corrected.

Information recorded in the multilayer optical disc is preferably reproduced based on differences between a light amount detected by the photodetector region and light amounts detected by the plurality of divided photodetector regions.

In this case, interlayer crosstalk can be reduced and the information recorded in the multilayer optical disc can be precisely reproduced by subtracting a constant multiple of a sum signal of the plurality of divided photodetector regions from the signal of the photodetector region.

The light source is preferably provided on the one substrate together with the second and third light receiving regions and used as the first light receiving region.

In this case, the information signal of the optical disc can be detected by detecting the intensity of a return light from the optical disc using the light source, the light source can be used as the photodetector for information signal detection, and a smaller-sized and more highly reliable optical head device for multilayer optical discs can be realized by integrating the photodetector for focus servo and the light source functioning as the photodetector for information signal detection.

It is preferable that the light splitting element splits the reflected light from the recording layer at least into four lights; that the photodetector includes a photodetector in which a fourth light receiving region for detecting one split light split by the light splitting element is provided on the one substrate together with the light source and the second and third light receiving regions; and that the fourth light receiving region is provided at an imaging position of a reflected light from a recording layer adjacent to the recording layer.

In this case, since the fourth light receiving region is provided at the imaging position of the reflected light from the recording layer adjacent to the recording layer, the fourth light receiving region can be used as the photodetector for tracking servo. As a result, a smaller-sized and more highly reliable optical head device for multilayer optical discs can be realized by integrating the photodetector for tracking servo, the photodetector for focus servo and the light source functioning as the photodetector for information signal detection.

The respective second and third light receiving regions preferably have sizes equal to or smaller than the sixfold of the Airy disc diameter of the split light.

In this case, focus servo can be performed with high accuracy since the influence of reflected lights from the other recording layers can be reduced without deteriorating a focus error signal.

A tracking error signal is preferably obtained based on signals from the second and third light receiving regions.

In this case, the second and third light receiving regions can be commoditized as the photodetector for tracking servo. Thus, a smaller-sized and more highly reliable optical head device for multilayer optical discs can be realized by integrating the photodetector for focus and tracking servo and the photodetector for information signal detection.

The light splitting element is preferably a diffractive optical element. In this case, the cost of the optical head device can be reduced and a degree of freedom in arranging the light receiving regions can be improved.

The light splitting element is preferably a compound prism. In this case, the positions of the split lights can be precisely determined and the detection accuracies of the respective light receiving regions can be improved.

An optical information processor according to another mode of the present invention comprises any one of the above optical head devices and a driving mechanism for driving the optical disc. By this construction, a small-sized and reliable optical information processor can be realized.

INDUSTRIAL APPLICATION

An optical head device and an optical information processor according to the present invention can be constructed with a smaller number of parts and can suppress a displacement of a photodetector in response to vibration and ambient temperature change, and is useful as a storage drive for computer or a drive for video recording and reproduction.

What is claimed is:
1. An optical head device comprising:
at least one light source;
a collective lens for focusing a light emitted from the light source on an arbitrary recording layer of a multilayer optical disc including a plurality of recording layers;
a light splitting element including a first light splitting element for splitting a reflected light from the arbitrary recording layer and a second light splitting element for splitting the reflected light split by the first light splitting element into at least three lights; and a photodetector comprising at least first to third light receiving regions, provided on one substrate, for detecting the at least three lights, wherein:

the second light splitting element causes one of the at least three lights to be incident on the first light receiving region to detect an information signal from the optical disc, the second light receiving region is substantially arranged at a side of the focus position of the split light closer to the collective lens, the third light receiving region is substantially arranged at a position located at a side of the focus position of the split light opposite to the collective lens and symmetrical with the second light receiving region.

2. An optical head device according to claim 1, wherein:

the second light splitting element splits the reflected light split by the first light splitting element into at least four lights;

the photodetector comprises a fourth light receiving region, provided on the one substrate, for detecting one of the at least four lights; and the fourth light receiving region is provided at an imaging position of a reflected light from a recording layer adjacent to the arbitrary recording layer.

3. An optical head device according to claim 1, wherein the light source is provided on the one substrate together with the light receiving regions.

4. An optical head device according to claim 1, wherein the first light receiving region has a size equal to or smaller than the threefold of the Airy disc diameter of the split light.

5. An optical head device according to claim 1, wherein the first light receiving region includes a photodetector region having a size equal to or smaller than the threefold of the Airy disc diameter of the light split by the first light splitting element and a plurality of divided photodetector regions arranged around the photodetector region.

6. An optical head device according to claim 5, wherein information recorded in the multilayer optical disc is reproduced based on differences between a light amount detected by the photodetector region and light amounts detected by the plurality of divided photodetector regions.

7. An optical head device according to claim 1, wherein the light source is provided on the one substrate together with the second and third light receiving regions and is used as the first light receiving region.

8. An optical head device comprising:

at least one light source;

a collective lens for focusing a light emitted from the light source on an arbitrary recording layer of a multilayer optical disc including a plurality of recording layers;

a light splitting element for splitting the reflected light from the arbitrary recording layer into at least four lights;

a photodetector comprising at least first to fourth light receiving regions, provided on one substrate, for detecting the at least four lights, wherein:

the light splitting element causes one of the at least four lights to be incident on the first light receiving region to detect an information signal from the optical disc, the second light receiving region is substantially arranged at a side of the focus position of the split light closer to the collective lens, the third light receiving region is substantially arranged at a position located at a side of the focus position of the split light opposite to the collective lens and symmetrical with the second light receiving region, the light source is provided on the one substrate together with the second and third light receiving regions and is used as the first light receiving region, and the fourth light receiving region is provided at an imaging position of a reflected light from a recording layer adjacent to the arbitrary recording layer.

9. An optical head device according to claim 1, wherein the second and third light receiving regions have respective sizes equal to or smaller than the sixfold of the Airy disc diameter of the split light.

10. An optical head device according to claim 1, wherein a tracking error signal is obtained based on signals from the second and third light receiving regions.

11. An optical head device according to claim 1, wherein the light splitting element is a diffractive optical element.

12. An optical head device according to claim 1, wherein the light splitting element is a compound prism.

13. An optical information processor, comprising:

an optical head device according to claim 1, and a driving mechanism for driving the optical disc.

* * * * *